United States Patent
Islam

(10) Patent No.: US 6,600,592 B2
(45) Date of Patent: Jul. 29, 2003

(54) S+ BAND NONLINEAR POLARIZATION AMPLIFIERS

(75) Inventor: Mohammed N. Islam, Allen, TX (US)

(73) Assignee: Xtera Communications, Inc., Allen, TX (US)

(*) Notice: Subject to any disclaimer, the term of this patent is extended or adjusted under 35 U.S.C. 154(b) by 40 days.

(21) Appl. No.: 09/765,972

(22) Filed: Jan. 19, 2001

(65) Prior Publication Data

US 2001/0048343 A1 Dec. 6, 2001

Related U.S. Application Data

(60) Continuation-in-part of application No. 09/760,201, filed on Jan. 12, 2001, and a continuation-in-part of application No. 09/558,300, filed on Apr. 25, 2000, now Pat. No. 6,239,903, which is a division of application No. 09/046,900, filed on Mar. 24, 1998, now Pat. No. 6,101,024.

(51) Int. Cl.[7] .............................. G02B 6/28; H01S 1/28
(52) U.S. Cl. ............. 359/334; 359/341.31; 359/341.23; 372/6
(58) Field of Search .............................. 359/334, 337.4, 359/341.31; 372/3, 70

(56) References Cited

U.S. PATENT DOCUMENTS

| | | | |
|---|---|---|---|
| 4,063,106 A | 12/1977 | Ashkin et al. ............. 307/88.3 |
| 4,685,107 A | 8/1987 | Kafka et al. .................... 372/6 |
| 4,740,974 A | 4/1988 | Byron ............................ 372/3 |
| 4,831,616 A | 5/1989 | Huber ............................ 370/3 |
| 4,881,790 A | 11/1989 | Mollenauer ............... 350/96.16 |
| 4,923,291 A | 5/1990 | Edagawa et al. ........... 359/337 |
| 4,932,739 A | 6/1990 | Islam ....................... 350/96.15 |
| 4,952,059 A | 8/1990 | Desurvire et al. .......... 356/350 |
| 4,995,690 A | 2/1991 | Islam ....................... 350/96.15 |
| 5,020,050 A | 5/1991 | Islam ............................ 370/4 |
| 5,039,199 A | 8/1991 | Mollenauer et al. ........ 359/334 |
| 5,050,183 A | 9/1991 | Duling, III .................... 372/94 |
| 5,058,974 A | 10/1991 | Mollenauer ................... 385/27 |

(List continued on next page.)

FOREIGN PATENT DOCUMENTS

| | | | |
|---|---|---|---|
| EP | 0 421 675 A2 | 9/1990 | ........... H04B/10/16 |
| EP | 0 841 764 A2 | 5/1998 | ........... H04B/10/24 |
| EP | 0 903 876 A1 | 3/1999 | ........... H04B/10/17 |
| EP | 0 903 877 A2 | 3/1999 | ........... H04B/10/18 |
| EP | 0 936 761 A1 | 8/1999 | ........... H04B/10/18 |
| EP | 1 054 489 A2 | 11/2000 | ........... H01S/10/17 |
| EP | 1 069 712 A2 | 1/2001 | ........... H04B/10/17 |
| EP | 1 180 860 A1 | 2/2001 | ........... H04B/10/17 |

(List continued on next page.)

OTHER PUBLICATIONS

Kummer, Raymond B., "Loss Compensation in Dispersion Compensating Fiber Modules by Raman Amplification", OFC 1998 Technical Digest Series, vol. 2, pp. 20–21.

Stolen et al., "Parametric Amplification and Frequency Conversion in Optical Fibers," IEEE Journal of Quantum Electronics, vol. QE–18, No. 7, pp. 1062–1072, Jul. 1982.

Song et al., "Sensitivity improvement for NRZ optical systems using NALM and narrow–band filter," LEOS, vol. 2, pp. 111–112, Nov. 18–19, 1996.

(List continued on next page.)

Primary Examiner—Nelson Moskowitz
(74) Attorney, Agent, or Firm—Baker Botts L.L.P.

(57) ABSTRACT

An amplified broadband optical signal is produced in a transmission system. An optical signal is divided into a first beam and a second beam. The first beam has a wavelength less than a predetermined wavelength. The second beam has a wavelength greater than the predetermined wavelength. The first beam is directed to a transmission link in the transmission system. The transmission system includes a distributed Raman amplifier. The distributed Raman amplifier operates in the wavelength range less than 1480 nm. The second beam is directed to a second amplifier. The first and second beams are combined. An amplified broadband optical signal is produced.

22 Claims, 12 Drawing Sheets

U.S. PATENT DOCUMENTS

| | | | |
|---|---|---|---|
| 5,078,464 A | 1/1992 | Islam | 385/122 |
| 5,101,456 A | 3/1992 | Islam | 385/27 |
| 5,107,360 A | 4/1992 | Huber | 359/124 |
| 5,115,488 A | 5/1992 | Islam et al. | 385/129 |
| 5,117,196 A | 5/1992 | Epworth et al. | 359/333 |
| 5,132,976 A | 7/1992 | Chung et al. | 372/6 |
| 5,134,620 A | 7/1992 | Huber | 372/6 |
| 5,140,456 A | 8/1992 | Huber | 359/341 |
| 5,151,908 A | 9/1992 | Huber | 372/6 |
| 5,153,762 A | 10/1992 | Huber | 359/125 |
| 5,159,601 A | 10/1992 | Huber | 372/6 |
| 5,166,821 A | 11/1992 | Huber | 359/238 |
| 5,187,760 A | 2/1993 | Huber | 385/37 |
| 5,191,586 A | 3/1993 | Huber | 372/6 |
| 5,191,628 A | 3/1993 | Byron | 385/27 |
| 5,200,964 A | 4/1993 | Huber | 372/26 |
| 5,208,819 A | 5/1993 | Huber | 372/32 |
| 5,210,631 A | 5/1993 | Huber et al. | 359/132 |
| 5,212,579 A | 5/1993 | Huber et al. | 359/182 |
| 5,218,655 A | 6/1993 | Mizrahi | 385/39 |
| 5,222,089 A | 6/1993 | Huber | 372/6 |
| 5,224,194 A | 6/1993 | Islam | 385/122 |
| 5,225,925 A | 7/1993 | Grubb et al. | 359/341 |
| 5,226,049 A | 7/1993 | Grubb | 372/6 |
| 5,243,609 A | 9/1993 | Huber | 372/9 |
| 5,257,124 A | 10/1993 | Glaab et al. | 359/124 |
| 5,268,910 A | 12/1993 | Huber | 372/6 |
| 5,271,024 A | 12/1993 | Huber | 372/6 |
| 5,283,686 A | 2/1994 | Huber | 359/337 |
| 5,293,545 A | 3/1994 | Huber | 359/111 |
| 5,295,016 A | 3/1994 | Van Deventer | 359/347 |
| 5,295,209 A | 3/1994 | Huber | 385/37 |
| 5,301,054 A | 4/1994 | Huber et al. | 359/132 |
| 5,321,543 A | 6/1994 | Huber | 359/187 |
| 5,321,707 A | 6/1994 | Huber | 372/6 |
| 5,323,404 A | 6/1994 | Grubb | 372/6 |
| 5,331,449 A | 7/1994 | Huber et al. | 359/125 |
| 5,359,612 A | 10/1994 | Dennis et al. | 372/18 |
| 5,369,519 A | 11/1994 | Islam | 359/173 |
| 5,373,389 A | 12/1994 | Huber | 359/195 |
| 5,389,779 A | 2/1995 | Betzig et al. | 250/216 |
| 5,400,166 A | 3/1995 | Huber | 359/173 |
| 5,416,629 A | 5/1995 | Huber | 359/182 |
| 5,450,427 A | 9/1995 | Fermann et al. | 372/18 |
| 5,467,212 A | 11/1995 | Huber | 359/168 |
| 5,473,622 A | 12/1995 | Grubb | 372/6 |
| 5,477,555 A | 12/1995 | Debeau et al. | 372/25 |
| 5,479,291 A | 12/1995 | Smith et al. | 359/333 |
| 5,485,481 A | 1/1996 | Ventrudo et al. | 372/6 |
| 5,485,536 A | 1/1996 | Islam | 385/31 |
| 5,497,386 A | 3/1996 | Fontana | 372/18 |
| 5,504,609 A | 4/1996 | Alexander et al. | 359/125 |
| 5,504,771 A | 4/1996 | Vahala et al. | 372/94 |
| 5,513,194 A | 4/1996 | Tamura et al. | 372/6 |
| 5,521,738 A | 5/1996 | Froberg et al. | 359/184 |
| 5,530,710 A | 6/1996 | Grubb | 530/6 |
| 5,532,864 A | 7/1996 | Alexander et al. | 359/177 |
| 5,541,947 A | 7/1996 | Mourou et al. | 372/25 |
| 5,542,011 A | 7/1996 | Robinson | 385/24 |
| 5,555,118 A | 9/1996 | Huber | 359/125 |
| 5,557,442 A | 9/1996 | Huber | 359/179 |
| 5,559,920 A | 9/1996 | Chraplyvy et al. | 385/123 |
| 5,577,057 A | 11/1996 | Frisken | 372/18 |
| 5,579,143 A | 11/1996 | Huber | 359/130 |
| 5,600,473 A | 2/1997 | Huber | 359/179 |
| 5,617,434 A | 4/1997 | Tamura et al. | 372/6 |
| 5,623,508 A | 4/1997 | Grubb et al. | 372/3 |
| 5,659,351 A | 8/1997 | Huber | 348/7 |
| 5,659,559 A | 8/1997 | Ventrudo et al. | 372/6 |
| 5,659,644 A | 8/1997 | DiGiovanni et al. | 385/31 |
| 5,664,036 A | 9/1997 | Islam | 385/31 |
| 5,673,280 A | 9/1997 | Grubb et al. | 372/3 |
| 5,673,281 A | 9/1997 | Byer | 372/3 |
| 5,689,596 A | 11/1997 | Evans | 385/27 |
| 5,689,598 A | 11/1997 | Dean, Jr. et al. | 385/27 |
| 5,701,186 A | 12/1997 | Huber | 359/125 |
| 5,726,784 A | 3/1998 | Alexander et al. | 359/125 |
| 5,734,665 A | 3/1998 | Jeon et al. | 372/6 |
| 5,757,541 A | 5/1998 | Fidric | 359/341 |
| 5,768,012 A | 6/1998 | Zanoni | 359/341 |
| 5,778,014 A | 7/1998 | Islam | 372/6 |
| 5,790,300 A * | 8/1998 | Zediker et al. | 359/334 |
| 5,796,909 A | 8/1998 | Islam | 385/147 |
| 5,798,853 A | 8/1998 | Watanabe | 359/160 |
| 5,798,855 A | 8/1998 | Alexander et al. | 359/177 |
| 5,815,518 A | 9/1998 | Reed et al. | 372/6 |
| 5,825,520 A | 10/1998 | Huber | 359/130 |
| 5,838,700 A | 11/1998 | Dianov et al. | 372/6 |
| 5,841,797 A | 11/1998 | Ventrudo et al. | 372/6 |
| 5,847,862 A | 12/1998 | Chraplyvy et al. | 359/337 |
| 5,861,981 A * | 1/1999 | Jabr | 359/341 |
| 5,878,071 A | 3/1999 | Delavaux | 372/94 |
| 5,880,866 A | 3/1999 | Stolen | 359/138 |
| 5,883,736 A | 3/1999 | Oshima et al. | 359/341 |
| 5,887,093 A | 3/1999 | Hansen et al. | 385/27 |
| 5,905,838 A | 5/1999 | Judy et al. | 385/123 |
| 5,920,423 A | 7/1999 | Grubb et al. | 359/341 |
| 5,959,750 A | 9/1999 | Eskildsen et al. | 359/134 |
| 5,978,130 A | 11/1999 | Fee et al. | 359/341 |
| 6,043,927 A | 3/2000 | Islam | 359/332 |
| 6,052,393 A | 4/2000 | Islam | 359/341 |
| 6,072,601 A | 6/2000 | Toyohara | 372/6 |
| 6,081,355 A | 6/2000 | Sharma et al. | 359/110 |
| 6,081,366 A | 6/2000 | Kidorf et al. | 359/341 |
| 6,088,152 A | 7/2000 | Berger et al. | 359/334 |
| 6,101,024 A * | 8/2000 | Islam et al. | 359/334 |
| 6,104,733 A | 8/2000 | Espindola | 372/6 |
| 6,147,794 A | 11/2000 | Stentz | 359/334 |
| 6,151,160 A | 11/2000 | Ma et al. | 359/341 |
| 6,191,877 B1 * | 2/2001 | Chraplyvy et al. | 359/124 |
| 6,204,960 B1 * | 3/2001 | Desurvire | 359/341 |
| 6,219,176 B1 | 4/2001 | Terahara | 359/341 |
| 6,236,496 B1 * | 5/2001 | Yamada et al. | 359/341 |
| 6,239,902 B1 | 5/2001 | Islam et al. | 359/334 |
| 6,239,903 B1 * | 5/2001 | Islam | 359/337 |
| 6,263,139 B1 | 7/2001 | Kawakami et al. | 385/123 |
| 6,310,716 B1 | 10/2001 | Evans et al. | 359/334 |
| 6,320,884 B1 | 11/2001 | Kerfoot, III et al. | 372/3 |
| 6,335,820 B1 * | 1/2002 | Islam | 359/334 |
| 6,356,383 B1 | 3/2002 | Cornwell, Jr. et al. | 359/334 |
| 6,356,384 B1 * | 3/2002 | Islam | 359/334 |
| 6,359,725 B1 * | 3/2002 | Islam | 359/334 |
| 6,370,164 B1 | 4/2002 | Islam | 372/6 |
| 6,374,006 B1 | 4/2002 | Islam et al. | 385/15 |
| 6,381,391 B1 | 4/2002 | Islam et al. | 385/123 |
| 6,404,964 B1 | 6/2002 | Bhagavatula et al. | 385/123 |
| 6,414,786 B1 | 7/2002 | Foursa | 359/334 |
| 6,417,959 B1 | 7/2002 | Bolshtyansky et al. | 359/334 |
| 6,433,921 B1 * | 8/2002 | Wu et al. | 359/334 |
| 6,437,906 B1 | 8/2002 | Di Pasquale et al. | 359/337.2 |
| 2001/0014194 A1 | 8/2001 | Sasaoka et al. | 385/15 |
| 2002/0001123 A1 | 1/2002 | Miyakawa et al. | 359/334 |

FOREIGN PATENT DOCUMENTS

| | | | | |
|---|---|---|---|---|
| FR | 2 764 452 A1 | 11/1998 | | H04J/14/02 |
| JP | 58208731 A | 5/1982 | | G02F/1/25 |
| JP | 739497 | 1/1997 | | |
| WO | WO 98/20587 | 5/1998 | | H01S/3/30 |
| WO | 98/42088 | 9/1998 | | H04B/10/17 |
| WO | 99/41855 | 8/1999 | | H04B/10/02 |
| WO | 99/43117 | 8/1999 | | H04J/14/00 |

| | | | |
|---|---|---|---|
| WO | 99/48176 | 9/1999 | ............. H01S/3/30 |
| WO | 99/49580 | 9/1999 | |
| WO | 99/62407 | 12/1999 | ........... A61B/17/04 |
| WO | 99/66607 | 12/1999 | |
| WO | 00/49721 | 8/2000 | |
| WO | 01/52372 A1 | 7/2001 | ............. H01S/3/30 |
| WO | 01/76350 A2 | 10/2001 | |
| WO | 01/78264 A2 | 10/2001 | ........... H04B/10/00 |
| WO | 02/17518 * | 2/2002 | |
| WO | 01/78263 A2 | 10/2002 | ........... H04B/10/00 |

OTHER PUBLICATIONS

Agrawal, "Fiber–Optic Communication Systems," Second Edition, Basic Concepts, 2nd Ed. John Wiley & Sons, pp. 365–366, 1997.

Leng et al., "8–channel WDM soliton amplification and signal recovery," ECOC, vol. 1, pp. 105–106, Sep. 20–24, 1998.

Lewis et al., "1.4W Saturated Output Power froma Fibre Raman Amplifier, " OFC Technical Digest, paper WG5, pp. 114–116, 1999.

Freeman et al., "High Capacity EDFA with Output Power to Support Densley Loaded Channels," OFC Technical Digest, paper WA6, pp. 16–18, 1999.

Goldberg et al., "High Power Side–Pumped Er/Yb Dobed Fiber Amplifier," OFC Technical Digest, paper WA7, pp. 19–21, 1999.

Pasquale et al., "23 dBm Output Power Er/YbCo–Doped Fiber Amplifier for WDM Signals inthe 1575–1605 nm Wavelength region," OFC Technical Digest, paper WA2, pp. 4–6, 1999.

Becker et al., "Erbium Doped Fiber Amplifiers Fundamentals and Technology," Academic Press, pp. 55–60, 1999.

Arend et al., "A nonlinear amplifying loop mirror operating with wavelength division multiplexed data," LEOS, vol. 2, pp. 479–480, 1999.

Lewis et al., "Gain and saturation characteristics of dual–wavelength–pumped silica–fibre Raman amplifiers," Electronics Letters, vol. 35, No. 14, pp. 1178–1179, Jul. 8, 1999.

Suzuki et al., "50 GHz spaced, 32 × 10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Namiki et al., "Recent Advances in Ultra–Wideband Raman Amplifiers," OFCC, vol. 4, pp. 98–99, Mar. 7–10, 2000.

Lewis et al., "Low–Noise High GainDispersion Compensating Broadband Raman Amplifier," OFCC, vol. 1, pp. 5–7, Mar. 7–10, 2000.

Roy et al., "48% Power Conversion Efficiency in a Single–Pump Gain–Shifted Thulium–Doped Fiber Amplifier," OFCC, vol. 4, pp. 17–22, Mar. 7–10, 2000.

Fludger et al., "An Analysis of the Improvements in OSNR from Distributed Raman Amplifiers Using Modern Transmission Fibres," OFCC, vol. 4, pp. 100–102, Mar. 7–10, 2000.

Nielsen et al., "3.28 Tb/s (82×40 Gb/s) transmission over 3 × 100 km nonzero–dispersion fiber using dual C–and L–band hybrid Raman/Erbium–doped inline amplifiers," OFCC 2000, pp. 1229–1231, Mar. 7–10, 2000.

Koch et al., "Broadband gain flattened Raman Amplifier to extend operation in the third telecommunication window," OFC 2000, pp. 103–105, Mar. 7–10, 2000.

Emori et al., "Cost–effective depolarized diode pump unit designed for C–band flat–gain Raman amplifiers to control EDFA gain profile," OFC 2000–1, pp. 106–108, Mar. 7–10, 2000.

Provino et al., "Broadband and Nearly Flat Parametric Gain in Single–Mode Fibers," Lasers and Electro–Optics Europe, p. 1, Sep. 10–15, 2000.

Rini et al., "Numerical Modeling and Optimization of Cascaded CW Raman Fiber Lasers," IEEE Journal of Quantum Electronics, vol. 36, No. 10, pp. 1117–1122, Oct. 2000.

Aso et al., "Recent Advances in Ultra–Broadband Fiberoptics Wavelength Converters," Lasers and Electro–Optics Society 2000 Annual Meeting, vol. 2, pp. 683–684, Nov. 13–16, 2000.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Fludger et al., "Fundamental Noise Limits in Broadband Raman Amplifiers," OFCC, vol. 1, pp. MA5/1–MA5/3, Mar. 17–22, 2001.

Jackson, Theoretical Characterization of Raman Oscillation with Intracavity Pumping of Fiber Lasers, IEEE Journal of Quantum Electronics, vol. 37, No. 5, pp. 626–634, May 2001.

Pending Patent Application; U.S. Ser. No. 09/811,067, entitled "Method and System for Reducing Degradation of Optical Signal to Noise Ratio," filed Mar. 16, 2001.

Pending Patent Application; U.S. Ser. No. 09/811,103; entitled"Systems and Method for Wide Band Raman Amplification," filed Mar. 16, 2001.

Pending Patent Application; U.S. Ser. No. 09/916,454; entitled "Systems and Method for Controlling Noise Figure," filed Jul. 27, 2001.

Pending Patent Application; U.S. Ser. No. 09/768,367, entitled "All Band Amplifier," filed Jan. 22, 2001.

Pending Patent Application; U.S. Ser. No. 09/766,489; entitled "Nonlinear Polarization Amplifiers in Nonzero Dispersion Shifted Fiber," filed Jan. 19, 2001.

Pending Patent Application; U.S. Ser. No. 09/800,085; entitled "Dispersion Compensating Nonlinear Polarization Amplifier," filed Mar. 5, 2001.

Pending Patent Application; U.S. Ser. No. 09/547,169; entitled "Braodband Amplifier and Communication System," filed Apr. 11, 2000.

Pending Patent Application; U.S. Ser. No. 09/694,858; entitled "Nonlinear Fiber Amplifiers used for a 1430–1530nm Low–Loss Window in Optical Fibers," filed Oct. 23, 2000.

Pending Patent Application; U.S. Ser. No. 09/719,591; entitled "Fiber–Optic Compensation for Dispersion, Gain Tilt, and Band Pump Nonlinearity," filed Jun. 16, 1999.

Pending Patent Application; U.S. Ser. No. 09/866,497; entitled "Nonlinear Fiber Amplifiers Used for A 1430–1530nm Low–Loss Window In Optical Fibers," filed May 25, 2001.

Pending Patent Application; U.S. Ser. No. 10/003,199; entitled "Broadband Amplifier and Communication System," filed Oct. 30, 2001.

Pending Patent Application; U.S. Ser. No. 10/003,199; entitled "Multi–Stage Optical Amplifier and Broadband Communication System," file Oct. 30, 2001.

Pending Patent Application; U.S. Ser. No. 10/005,472; entitled "Multi–Stage Optical Amplifier and Broadband Communication System," filed Nov. 6, 2001.

Pending Patent Application; U.S. Ser. No. 10/014,839; entitled "Multi–Stage Optical Amplifier and Broadband Communication System," filed Dec. 10, 2001.

Pending Patent Application; U.S. Ser. No. 09/990,142; entitled "Broadband Amplifier and Communication System," filed Nov. 20, 2001.

Pending Patent Application; U.S. Ser. No. 10/033,848; entitled "Broadband Sagnac Raman Amplifiers and Cascade Lasers," filed Dec. 19, 2001.

Pending Patent Application; U.S. Ser. No. 10/100,591; entitled "System and Method for Managing System Margin," Mar. 15, 2002.

Pending Patent Application; U.S. Ser. No. 10/100,587; entitled "Fiber Optic Transmission System with Low Cost Transmitter Compensation," filed Mar. 15, 2002.

Pending Patent Application; U.S. Ser. No. 10/116,487; entitled "Fiber Optic Transmission System for a Metropolitan Area Network," filed Apr. 3, 2002.

PCT International Search Report Form PCT/ISA/210 May 19, 1999.

PCT International Search Report Form PCT/ISA/210, Aug. 23, 1999.

PCT International Search Report Form PCT/ISA/210, Dec. 21, 2001.

PCT International Search Report Form PCT/ISA/210, Jan. 22, 2002.

PCT International Search Report Form PCT/ISA/210, Jan. 22, 2002.

Sun, Y. et al., "80nm Ultra–Wideband Erbium–Doped Silica Fibre Amplifier" Electronics Letters, Nov. 6, 1997, vol. 33, No. 23, pp. 1965–1967.

Wysocki, P.F. et al., "Broad–Band Erbium–Doped Fiber Amplifier Flattened Beyond 40nm Using Long–Period Grating Filter", IEEE Photonics, vol. 9, No. 10, Oct. 10, 1997, pp. 1343–1345.

Liaw, S–K et al., "Passive Gain–Equilized Wide–Band Erbium–Doped Fiber Amplifier Using Samarium–Doped Fiber", IEEE Photonics Technology: Letters, vol. 8, No. 7, Jul. 7, 1996, pp. 879–881.

Yamada, M. et al., "A Low–Noise and Gain–Flattened Amplifier Composed of a Silica–Based and a Fluoride–Based Er3+–Doped Fiber Amplifierin a Cascade Configuration", IEEE Photonics Letters, vol. 8, No. 5, May 1996, pp. 620–622.

Ma, M.X. et al., "240–km Repeater Spacing in a 5280–km WDM System Experiment Using 8×2.5 Gb/s NRZ Transmission", IEEE Photonics Technology Letters, vol. 10, No. 6, Jun. 1998, pp. 893–895.

Masuda, H. et al., "Ultrawide 75–nm 3–db Gain–Band Optical Amplification with Erbium–Doped Fluoride Fiber Amplifiers and Distributed Raman Amplifiers", IEEE Photonics Technology Letters, vol. 10, No. 4, Apr. 1998, pp. 516–518.

Masuda, H. et al., "Wide–Band and Gain Flattened Hybrid Fiber Amplifier Consisting of an EDFA and a Multiwavelength Pumped Raman Amplifier", IEEE Photonics Technology Letters, vol. 11, No.6, Jun. 1999, pp. 647–649.

Kawaii, S. et al., "Ultra–Wide, 75nm 3dB Gain–Band Optical Amplifier Utilising Gain–Flattened Erbium–Doped Fluoride Fibre Amplifier and Discrete Raman Amplification", Electronic Letters, vol. 34, No. 9, Apr. 30, 1998, pp. 897–898.

Kawai, S. et al., "Ultrawide, 75nm 3dB Gain–Band Optical Amplifier Utilizing Erbium–Doped Fluoride Fiber and Raman Fiber", OFC Technical Digest, 1998.

Kidorf, H. et al., "Pump Interactions in a 100–nm Bandwidth Raman Amplifier", IEEE Electronics Technology Letters, vol. 11, No. 5, May 1999, pp. 530–532.

Ono, H. et al., "Gain–Flattened Er3+–Doped Fiber Amplifier for a WDM Signal in the 1.57–1.60–$\mu$m Wavelength Region", IEEE Photonics Technology Letters, vol. 9, No. 5, May 1997, pp. 596–598.

Hansen, P.B. et al., "529km Unrepeatered Transmission at 2.488 Gbit/s Using Dispersion Compensation, Forward Error Correction, and Remote Post–and Pre–amplifiers Pumped By Diode–Pumped Raman Lasers", IEEE Electronics Letters Online No. 19951043, Jul. 7, 1998.

Guy, M.J. et al., "Lossless Transmission of 2ps Pulses Over 45km of Standard Fibre at 1.3$\mu$m Using Distributed Raman Amplification", Electronics Letters, vol. 34, No. 8, Apr. 6, 1998, pp. 793–794.

Dianov, E.M. et al., "Highly Efficient 1.3$\mu$m Raman Fibre amplifier", Electronics Letters, vol. 34, No. 7, Apr. 2, 1998, pp. 669–670.

Chernikov, S.V. et al., "Raman Fibre Laser Operating at 1.24$\mu$m", Electronics Letters, vol. 34, No.7, Apr. 2, 1998, pp. 680–681.

Liaw, S–K et al., "Passive Gain–Equilized Wide–Band Erbium–Doped Fiber Amplifier Using Samarium–Doped Fiber", IEEE Photonics Technology Letters, vol. 8, No. 7, Jul. 1996, pp. 879–881.

Masuda, M. et al., "Wideband, Gain–Flattened, Erbium–Doped Fibre Amplifiers with 3dB Bandwidths of >50nm", Electronics Letters, vol. 33, No. 12, Jun. 5, 1997, pp. 1070–1072.

Yang, F.S. et al., "Demonstration of Two–Pump Fibre Optical Parametric Amplification", Electronics Letters, vol. 33, No. 21, Oct. 9, 1997, pp. 1812–1813.

Kawai, S. et al., "Wide–Bandwidth and Long Distance WDM Transmission Using Highly Gain–Flattened Hybrid Amplifier", IEEE Photonics Technology Letters, vol. 11, No. 7, Jul. 1999, pp. 886–888.

Paschotta, R. et al., "Ytterbium–Doped Fiber Amplifiers", IEEE Journal of Quantum Electronics, vol. 33, No. 7, Jul. 1997, pp. 1049–1056.

Chernikov, S.V. et al., "Raman Fibre Laser Operating at 1.24 $\mu$m" Electronics Letters, vol. 34, No. 7, Apr. 2, 1998, pp. 680–681.

Grubb, S.G. et al., "Fiber Raman Lasers Emit at Many Wavelengths", Laser Focus World, Feb. 1996, pp. 127–134.

Mollenauer, L.F. et al., "Dispersion–Managed Solitons for Terrestrial Transmission", Optical Society of America, 1999.

Hansen, S. L. et al., "Gain Limit in Erbium–Doped Fiber Amplifiers Due to Internal Rayleigh Backscattering", IEEE Photonics Technology Letters, vol. 4, No.6, Jun. 1992, pp. 559–561.

Spirit, D.M. et al., "Systems Aspects of Raman Fibre Amplifiers", Optical Amplifiers for Communication, vol. 137, Pt. J, No. 4, Aug. 1990, pp. 221–224.

Mollenenauer, L.F. et al., "Solution Propagation in Long Fibers with Periodically Compensated Loss", IEEE Journal of Quantum Electronics, vol. QE–22, No. 1, Jan. 1986, pp. 157–173.

Marhic, M.E. et al., "Cancellation of Stimulated–Raman–Scattering Cross Talk in Wavelength–Division–Multiplexed Optical Communication Systems by Series or Parallel Techniques", Optical Society of America, 1998, vol. 15, No. 3, pp. 958–963.

Hansen, P.B. et al., "Rayleigh Scattering Limitations in Distrigbuted Raman Pre–Amplifiers", IEEE Photonics Technology Letters, vol. 10, No. 1, Jan. 1998, pp. 159–161.

Ikeda, M., "Stimulated Raman Amplification Characteristics in Long Span Single–Mode Silica Fibers", Optics Communications, vol. 39, No. 3, 1981, pp. 148–152.

Solbach, K. et al., "Performance Degradation Due to Stimulated Raman Scattering in Wavelength–Division–Multiplexed Optical–Fibre Systems", Electronics Letters, vol. 19, No. 6, Aug. 4, 1983, pp. 641–643.

Grandpierre, A.G. et al., "Theory of Stimulated Raman Scattering Cancellation in Vawelength–Division–Multiplexed Systems via Spectral Inversion", IEEE Photonics Technology Letters, vol. 11, No. 10, Oct. 1999, pp. 1271–1273.

Chinn, S.R. "Analysis of Counter–Pumped Small–Signal Fibre Raman Amplifiers", Electronics Letters, vol. 33, No. 7, Mar. 27, 1997, pp. 607–608.

Stolen, R.H. et al., "Raman Gain in Glass Optical Waveguides", Appl. Phys. Lett. vol. 22, No. 6, Mar. 15, 1973, pp. 276–278.

Stolen, R.H. et al., "Development of the Stimulated Raman Spectrum in Single–Mode Silica Fibers", Optical Society of America, vol. 1, No. 4, Aug. 1984, pp. 662–667.

Nissov, M. et al., "100 gb/s (10×10Gb/s) WDM Transmission Over 7200 km Using Distributed Raman Amplification", Center for Broadband Telecommunications, pp. 9–12.

Takachio, N. et al., "32×10 Gb/s Distributed Raman Amplification Transmission with 50–GHz Channel Spacing in the Zero–Dispersion Region over 640km of 1.55–$\mu$m Dispersion–shifted Fiber", NTT Labs.

Hiroji Masuda and Shingo Kawal, Ultra Wide–Band Raman Amplification With A Total Gain–Bandwidth of 132 nm of Two Gain–Bands Around 1.5 $\mu$m, ECOC '99, Nice, France, pp. II–146–II–147, Sep. 26–30, 1999.

Sugizaki, et al., Slope Compensating DCF for S–band Raman Amplifier, OSA Tops vol. 60, Optical Amplifiers and Their Applications, Nigel Jolley, John D. Minelly, and Yoshiaki Nakano, eds., 2001 Optical Society of America, pp. 49–53.

Vasilyev, et al., Pump intensity noise and ASE spectrum of Raman amplification in non–zero dispersion–shifted fibers, reprinted from the Optical Amplifiers and Their Applications Conference, 2001, Technical Digest, 2001 Optical Society of America, pp. 57–59.

Ohishi et al., Proc. 1998. 11th Ann. Mtg. of et al., IEEE Lasers & Electrooptics Society, vol. 11, pp. 194–195, Dec. 4, 1998.

Chee et al., IEEE J.Q. E., vol. 26, #3, pp. 541–549, Mar. 1990.

Stolen et al., IEEE J.Q.E., vol. 18, #7, pp. 1062–1072, Jul. 1982.

Yamada et al., Electronics Letters, vol. 33, #8, pp. 710–711, Apr. 10, 1997.

Chee et al., IEEE, Journal of Quantum Electronics, vol. 26, #3, pp. 541–549, Mar. 1990.

Grobavsky et al, Optical Engineering, vol. 34, #4, pp. 1016–1018, Apr. 1995.

Stolen et al., "Parametric Amplification and Frequency Conversion in Optical Fiebers," IEEE Journal of Quantum Electronics, Jul. 1982, vol. QE–18, No. 7, pp. 1062–1072.

Agrawal, G.P., "Stimulated Raman Scattering," Chapter 8 and "Parametric Processes" Chapter 10 of Nonlinear Fiber Optics, 1989.

Yamada et al., "Broadband and Gain–Flattened Amplifier Composes of a 1.55$\mu$m–band and a 1.58$\mu$m–Band Doped Fiber Amplifier in a Parallel Configuration," Electronics Letters, Apr. 10, 1997, vol. 33, No. 8, pp. 710–711.

Masuda et al., Wideband, Gain–Flattened, Erbium–Doped Fibre Amplifiers with 3dB Bandwidths of)50 nm.

Wysockl et al., "Broad–Band Erbium–Doped Fiber Amplifiers Flattened Beyond 40 nm Using Long Period Grating Filter," 0 IEEE Photonics Technology Letters, Oct. 1997, vol. 9, No. 10, pp. 1343–1345.

Sun et al. "80 nm Ultra–Wideband Erbium–Doped Silica Fibre Amplifier." Nov. 6, 1997, vol. 33, No. 23, pp. 1965–1967.

Nissov, M., et al., "Rayleigh Crosstalk in Long Cascades of Distributed Unsaturated Raman Amplifiers", *Electronics Letters*, Jun. 10, 1999, vol. 35, No. 12, pp. 997–998.

Patent Abstracts of Japan, vol. 1997, No. 11, Nov. 28, 1997 & JP 09 197452 A ( NEC Corp.), Jul. 31, 1997, abstract.

* cited by examiner

1. Distributed Raman Amps is S+ band

2. Hybrid Raman Amps in S+ band

S+ BAND NONLINEAR POLARIZATION AMPLIFIERS

CROSS REFERENCE TO RELATED APPLICATIONS

This application is a continuation-in-part of and claims the benefit of priority from the U.S. application Ser. No. 09/760,201, titled "Low-Noise Distributed Raman Amplifier Using Bi-Directional Pumping Using Multiple Raman Orders," filed Jan. 12, 2001, and is a continuation-in-part of U.S. application Ser. No. 09/558,300, filed Apr. 25, 2000, now U.S. Pat. No. 6,239,903 issued May 29, 2001, which is a division of U.S. application Ser. No. 09/046,900, filed Mar. 24, 1998, now U.S. Pat. No. 6,101,024 issued Aug. 8, 2000, which applications are fully incorporated herein by reference.

FIELD OF THE INVENTION

The present invention relates generally to nonlinear polarization amplifiers, and more particularly to nonlinear polarization amplifiers used to amplify signals in the $S^+$ band, approximately ranging from 1430–1480 nm.

BACKGROUND OF THE INVENTION

Because of the increase in data intensive applications, the demand for bandwidth in communications has been growing tremendously. In response, the installed capacity of telecommunication systems has been increasing by an order of magnitude every three to four years since the mid 1970s. Much of this capacity increase has been supplied by optical fibers that provide a four-order-of-magnitude bandwidth enhancement over twisted-pair copper wires.

To exploit the bandwidth of optical fibers, two key technologies have been developed and used in the telecommunication industry: optical amplifiers and wavelength-division multiplexing (WDM). Optical amplifiers boost the signal strength and compensate for inherent fiber loss and other splitting and insertion losses. WDM enables different wavelengths of light to carry different signals parallel over the same optical fiber. Although WDM is critical in that it allows utilization of a major fraction of the fiber bandwidth, it would not be cost-effective without optical amplifiers. In particular, a broadband optical amplifier that permits simultaneous amplification of many WDM channels is a key enabler for utilizing the full fiber bandwidth.

Silica-based optical fiber has its lowest loss window around 1550 nm with approximately 25 THz of bandwidth between 1430 and 1620 nm. For example, FIG. 1 illustrates the loss profile of a 50 km optical fiber. In this wavelength region, erbium-doped fiber amplifiers (EDFAs) are widely used. However, as indicated in FIG. 2, the absorption band of a EDFA nearly overlaps its the emission band. For wavelengths shorter than about 1525 nm, erbium-atoms in typical glasses will absorb more than amplify. To broaden the gain spectra of EDFAs, various dopings have been added. For example, as shown in FIG. 3a, codoping of the silica core with aluminum or phosphorus broadens the emission spectrum considerably. Nevertheless, as depicted in FIG. 3b, the absorption peak for the various glasses is still around 1530 nm.

Hence, broadening the bandwidth of EDFAs to accommodate a larger number of WDM channels has become a subject of intense research. As an example of the state-of-the-art, a two-band architecture for an ultra-wideband EDFA with a record optical bandwidth of 80 nm has been demonstrated. To obtain a low noise figure and high output power, the two bands share a common first gain section and have distinct second gain sections. The 80 nm bandwidth comes from one amplifier (so-called conventional band or C-band) from 1525.6 to 1562.5 nm and another amplifier (so-called long band or L-band) from 1569.4 to 1612.8 nm. As other examples, a 54 nm gain bandwidth achieved with two EDFAs in a parallel configuration, i.e., one optimized for 1530–1560 nm and the other optimized for 1576–1600 nm, and a 52 nm EDFA that used two-stage EDFAs with an intermediate equalizer have been demonstrated.

These recent developments illustrate several points in the search for broader bandwidth amplifiers for the low-loss window in optical fibers. First, bandwidth in excess of 40–50 nm require the use of parallel combination of amplifiers even with EDFAs. Second, the 80 nm bandwidth may be very close to the theoretical maximum. The short wavelength side at about 1525 nm is limited by the inherent absorption in erbium, and long wavelength side is limited by bend-induced losses in standard fibers at above 1620 nm. Therefore, even with these recent advances, half of the bandwidth of the low-loss window, i.e., 1430–1530 nm, remains without an optical amplifier.

There is a need for low noise Raman amplifiers and broadband transmission systems. There is a further need for distributed, discrete and hybrid amplifiers with improved noise figures. Another need exists for optical amplifiers suitable for wavelengths of 1480 nm or less, where the S+ band is located.

SUMMARY OF THE INVENTION

Accordingly, an object of the present invention is to provide nonlinear polarization amplifiers.

Another object of the present invention is to provide a broadband fiber transmission system with at least one nonlinear polarization amplifier.

Yet another object of the present invention is to provide a broadband fiber transmission system with reduced fiber non-linear impairments.

A further another object of the present invention is to provide a broadband fiber transmission system that operates over the full low loss window of available and optical fibers.

Another object of the present invention is to provide a broadband fiber transmission system that uses distributed Raman amplification to lower signal power requirements.

One or more of the objects of the present invention are achieved in a broadband amplifier. The broadband amplifier includes a transmission fiber, a splitter, an S+ band distributed amplifier, a second optical amplifier, a combiner, and an output fiber. The splitter can be coupled to the transmission fiber. The splitter can split an optical signal into at least a first wavelength and a second wavelength. The S+ band distributed Raman amplifier can be coupled to the splitter that can operate in the range less than 1480 nm. A pump power of the S+ band distributed Raman amplifier can extend into the transmission fiber. The second optical amplifier can be coupled to the splitter. The combiner can be coupled to the S+ band distributed Raman amplifier and the second optical amplifier. The combiner can combine an optical signal into at least a first wavelength and a second wavelength. The output fiber can be coupled to the combiner.

In another embodiment of the invention, a method produces an amplified broadband optical signal in a transmission system. An optical signal is divided at a predetermined wavelength into a first beam having a wavelength less than the predetermined wavelength and a second beam having a wavelength greater than the predetermined wavelength. The first beam is directed to a transmission link in the transmission system that includes a distributed Raman amplifier operating in the wavelength range less than 1480 nm. The second beam is directed to a second amplifier. The first and second beams are combined to produce an amplified broadband optical signal.

In another embodiment of the invention, an S+ band amplifier includes a distributed Raman amplifier, a WDM, a discrete amplifier, and a pump source. The distributed Raman amplifier can include a signal transmission line with at least a portion of the signal transmission line incorporating a distributed gain medium. The WDM can be coupled to the signal transmission line. The discrete amplifier canbe coupled to the WDM. The pump source can be coupled to the WDM. The pump source can produce a pump beam $\lambda_p$ at wavelengths less than 1400 nm.

In another embodiment of the invention, an S+ band amplifier includes a distributed Raman amplifier, a discrete amplifier, a WDM, and a pump source. The distributed Raman amplifier can include a signal transmission fiber with at least a portion of the signal transmission line incorporating a distributed gain medium. The discrete amplifier can be coupled to the transmission line. Additional gain can be generated from the distributed Raman amplifier to compensate for a higher loss in the fiber when the fiber experiences a transmission loss of 0.03 dB/km greater than the transmission loss in the fiber at 1550 nm. The WDM can be coupled to the signal transmission line. The WDM can be positioned between the distributed Raman amplifier and the discrete amplifier. The pump source can be coupled to the WDM. The pump source can produce a pump beam $\lambda_p$.

In another embodiment of the invention, a method produces an amplified broadband optical signal. At least one fiber is provided that has a low loss window of 1430 to 1620 nm and a distributed Raman amplifier coupled to the fiber. The distributed Raman amplifier is operated at wavelengths in the range less than 1480 nm. An amplified signal is generated at wavelengths less than 1480 nm.

In another embodiment of the invention, a method produces an amplified broadband optical signal. A distributed Raman amplifier is provided with at least one fiber that has a low loss window of 1430 to 1620 nm and a third order non-linearity amplifier coupled to the fiber. The third order non-linearity amplifier is operated at wavelengths in the range of less than 1480 nm. An amplified signal is generated at wavelengths less than 1480 nm.

In another embodiment of the invention a method produces an amplified broadband optical signal. A distributed Raman amplifier is provided with at least one fiber that has a low loss window of 1430 to 1620 nm and a third order non-linearity amplifier coupled to the fiber. The third order non-linearity amplifier is operated at wavelengths in the range of less than 1480 nm. An amplified signal is generated in the wavelength range of less than 1480 nm.

DETAILED DESCRIPTION OF PREFERRED EMBODIMENTS

Some embodiments provide a structure for exploiting almost the full 25 THz of bandwidth available in the low-loss window of optical fibers from 1430 nm to 1620 nm. The broadband NLPA amplifier of some embodiments combines Raman amplification with either PA or 4WM to achieve bandwidth performance improvements that neither technology by itself has heretofore been able to deliver.

The broadband NLPA of other embodiments comprise an input port for inputting an optical signal having a wavelength $\lambda$, a distributed gain medium for receiving the optical signal and amplifying and spectrally broadening the same therein through nonlinear polarization, a pump source operated at wavelength $\lambda_p$ for generating a pumping light to pump the distributed gain medium, and an output port for outputting the amplified and spectrally broadened optical signal. The distributed gain medium can have zero-dispersion at wavelength $\lambda_0$ such that $\lambda \geq \lambda_0 \geq \lambda_p$. The pumping light can cascade through the distributed gain medium a plurality of Raman orders including an intermediate order having a wavelength $\lambda_r$ at a close proximity to the zero-dispersion wavelength $\lambda_0$ to phase match four-wave mixing (if $\lambda_r < \lambda_0$) or parametric amplification (if $\lambda_r > \lambda_0$).

A first embodiment of the NLPA uses open-loop amplification with an optical fiber gain medium. A pump source operated at 1240 nm can be used. The pump may be retro-reflected to increase the conversion efficiency. A second embodiment of the NLPA can use a Sagnac Raman cavity that is pumped at 1240 nm. Feedback in the Sagnac Raman cavity can reduce the required pump power, and the broadband cavity design supports much of the generated bandwidth. Another embodiment of the NLPA can use a Sagnac Raman cavity pumped at 1117 nm for a very broadband operation.

Other embodiments relate to a parallel optical amplification apparatus having a combination of optical amplifiers. In one embodiment, the parallel optical amplification apparatus comprises two parallel stages of NLPAs with one NLPA optimized for 1430 to 1480 nm and the other for 1480 to 1530 nm. In another embodiment, the full 25 THz of the low-loss window in optical fibers can be exploited by a parallel combination of a Raman amplifier and a rare earth doped amplifier. In one embodiment, an NLPA can cover the low-loss window of approximately 1430 nm to 1530 nm, and an EDFA can cover the low-loss window of approximately 1530 nm to 1620 nm.

Stimulated Raman scattering effect, PA and 4WM can be result of third-order nonlinearities that occur when a dielectric material such as an optical fiber is exposed to intense light. The third-order nonlinear effect can be proportional to the instantaneous light intensity.

Figure 1:
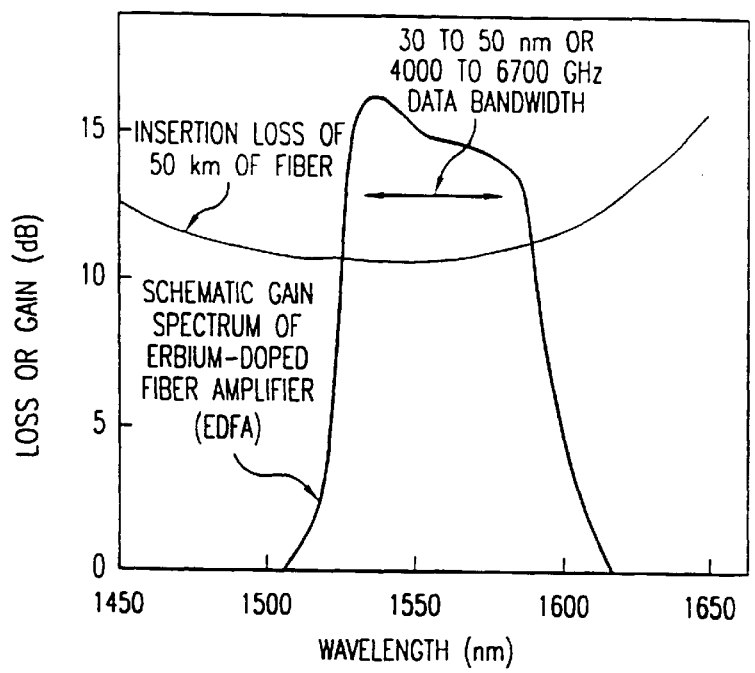
FIG. 1 is a plot of loss verses wavelength for 50 km fiber and the gain band of a typical EDFA.
Figure 2:
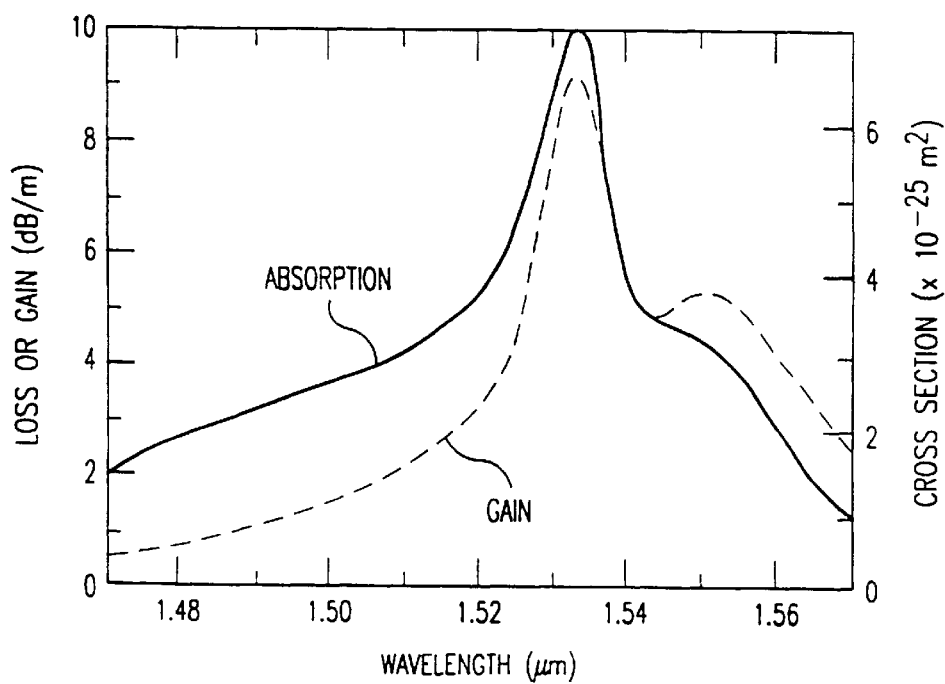
FIG. 2 is a graphical illustration of absorption and gain spectra of an EDFA.
Figure 3A:
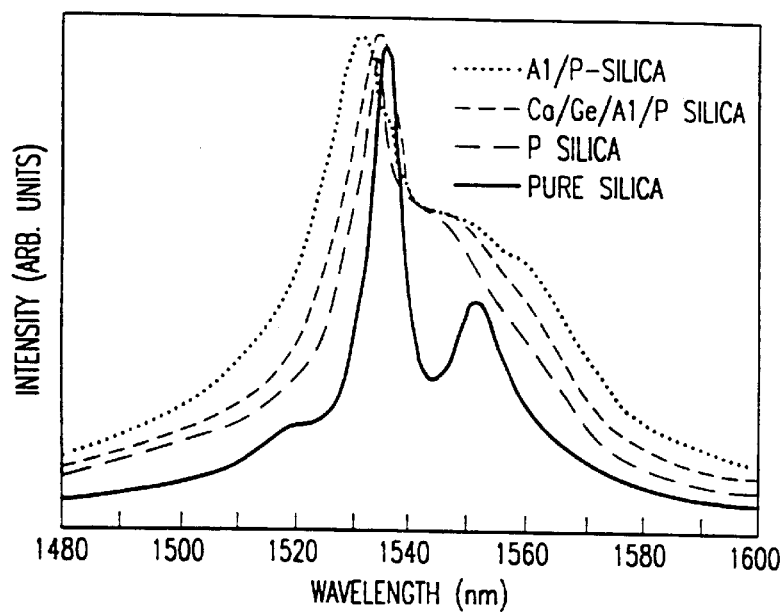
FIG. 3a is a graphical illustration of emission spectra of four EDFAs with different core compositions.
Figure 3B:
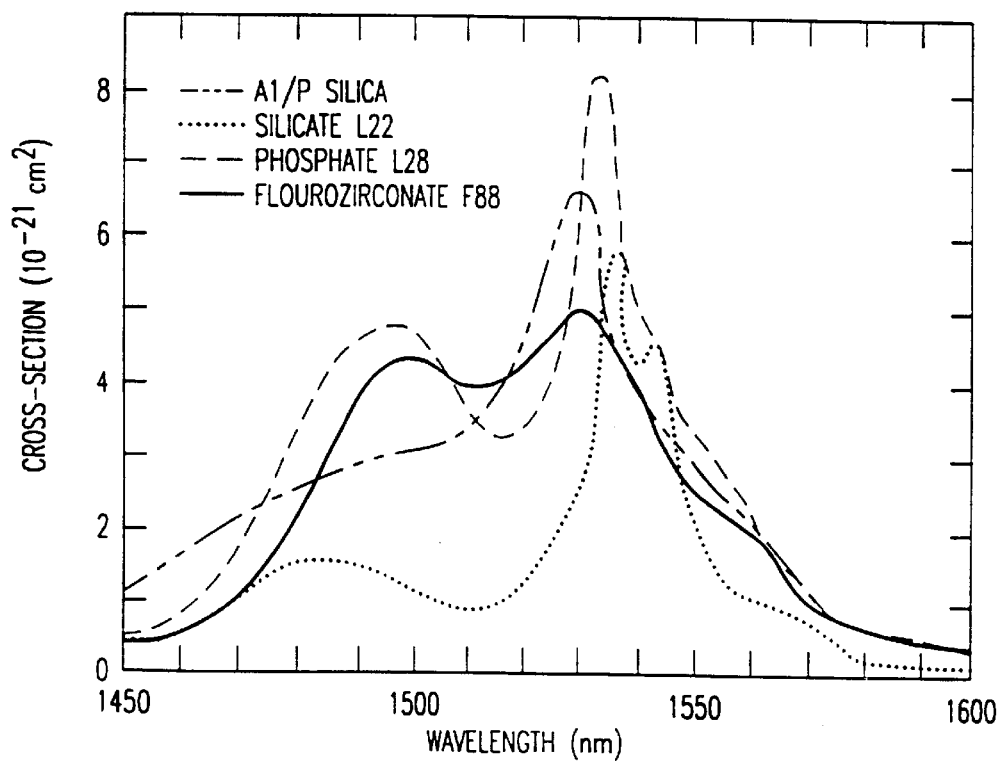
FIG. 3b is a graphical illustration of absorption cross-section of erbium-doped glass of different compositions.
Figure 4:
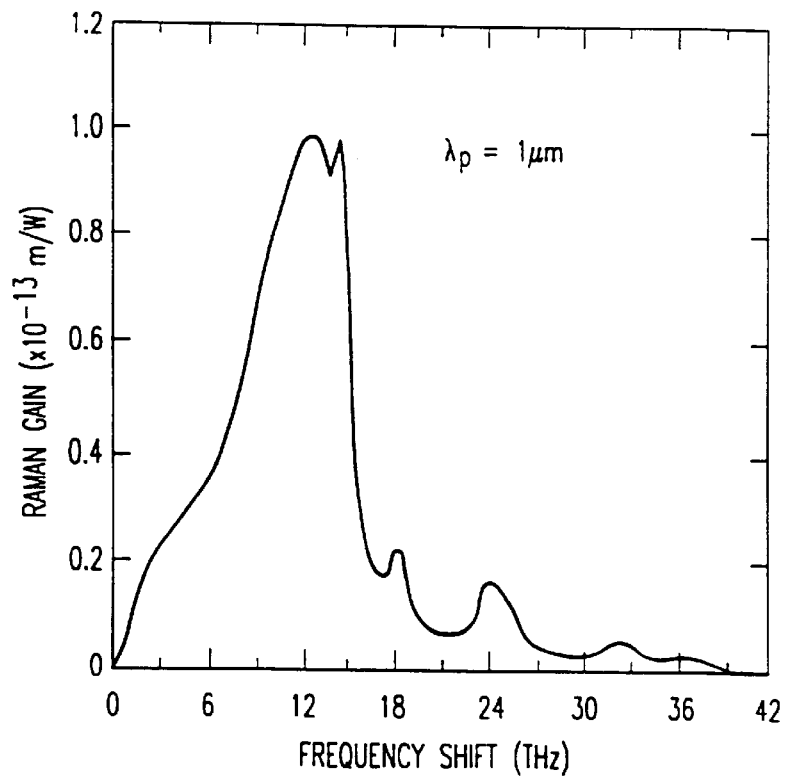
FIG. 4 is a graphical illustration of a measured Raman-gain spectrum for fused silica at a pump wavelength of 1000 nm.

Stimulated Raman scattering can be an important nonlinear process that turns optical fibers into amplifiers and tunable lasers. Raman gain can result from the interaction of intense light with optical phonons in silica fibers, and Raman effect leads to a transfer of energy from one optical beam (the pump) to another optical beam (the signal). The signal can be downshifted in frequency (or upshifted in wavelength) by an amount determined by vibrational modes of silica fibers. The Raman gain coefficient $g_r$ for the silica fibers is shown in FIG. 4. Notably, the Raman gain $g_r$ can extend over a large frequency range (up to 40 THz) with a broad peak centered at 13.2 THz (corresponding to a wavelength of 440 cm$^{-1}$). This behavior over the large frequency range can be due to the amorphous nature of the silica glass and enable the Raman effect to be used in broadband amplifiers. The Raman gain can depend on the composition of the fiber core and can vary with different dopant concentrations.

Raman amplification has some attractive features. First, Raman gain can upgrade existing fiber optic links because it is based on the interaction of pump light with optical phonons in the existing fibers. Second, in some embodiments there is no excessive loss in the absence of pump power—an important consideration for system reliability.

Raman cascading is the mechanism by which optical energy at the pump wavelength is transferred, through a series of nonlinear polarizations, to an optical signal at a longer wavelength. Each nonlinear polarization of the dielectric can produce a molecular vibrational state corresponding to a wavelength that is offset from the wavelength of the light that produced the stimulation. The nonlinear polarization effect can be distributed throughout the dielectric, resulting in a cascading series of wavelength shifts as energy at one wavelength excites a vibrational mode that produces light at a longer wavelength. This process can cascade through numerous orders. Because the Raman gain profile can have a peak centered at 13.2 THz in silica fibers, one Raman order can be arranged to be separated from the previous order by 13.2 THz.

Cascading makes stimulated Raman scattering amplifiers very desirable. Raman amplification can be used to amplify multiple wavelengths (as in wavelength division multiplexing) or short optical pulses because the gain spectrum can be very broad (a bandwidth of greater than 5 THz around the peak at 13.2 THz). Cascading can enable Raman amplification over a wide range of different wavelengths. By varying the pump wavelength or by using cascaded orders of Raman gain, the gain can be provided over the entire telecommunications window between 1300 nm and 1600 nm.

Parametric amplification and 4 wave mixing (PA/4WM) involve two pump (P) photons that create Stokes (S) and anti-Stokes (A) photons. Both PA/4WM and Raman amplification arise from the third order susceptibility $\chi^{(3)}$ in optical fibers. More specifically, the real part of $\chi^{(3)}$ the so-called nonlinear index of refraction $n_2$, is responsible for PA/4WM, while the imaginary part of $\chi^{(3)}$ associated with molecular vibrations corresponds to the Raman gain effect. In silica fibers of some embodiments, about $\frac{4}{5}$ths of the $n_2$ is an electronic, instantaneous nonlinearity caused by ultraviolet resonances, while about $\frac{1}{5}$th of $n_2$ arises from Raman-active vibrations, e.g., optical phonons. The imaginary part of this latter contribution corresponds to the Raman gain spectrum of FIG. 4.

Whereas Raman amplification is attractive for providing optical gain, PA/4WM can offer an efficient method to broaden the bandwidth of the optical gain. PA/4WM can have a much smaller frequency separation between pump and signal than Raman amplification, and the frequency difference may depend on the pump intensity. As in Raman amplification, one advantage of PA/4WM gain is that it can be present in every fiber. However, unlike the Raman effect, both PA and 4WM can require phase-matching. 4WM can be inefficient in long fibers due to the requirement for phase-matching. However, PA can act as self-phase-matched because the nonlinear index of refraction is used to phase match the pump and sidebands. This can be true in embodiments operating near the zero-dispersion wavelength in fibers. When 4WM and PA occur near the zero-dispersion wavelength of a single-mode fiber, phase-matching can become automatic in the fiber. In 4WM, sidebands can be generated without gain when the pump wavelength falls in the normal dispersion regime (where the pumping wavelength is shorter than the zero-dispersion wavelength). PA is 4-photon amplification in which the nonlinear index of refraction is used to phase match the pump and sidebands. For PA the pump wavelength can lie in the anomalous group velocity regime (i.e., where the pumping wavelength is longer than the zero-dispersion wavelength) and proper phase matching can require that pump and signal be co-propagating in some embodiments.

To illustrate the PA/4WM gain, the gain coefficient can be derived as:

$$g = \sqrt{(\gamma P)^2 - \left[\left(\frac{\Delta \kappa}{2}\right) + \gamma P\right]^2} \qquad 1$$

The first term under the square root sign corresponds to the third order nonlinearity that couples the pump photons to the sidebands. The second term corresponds to the phase mismatch between the waves and it consists of two parts: one due to the wave-vector mismatch at the different wavelengths and the other due to the increase in nonlinear index induced by the pump. The nonlinearity parameter can be defined as $$\gamma = \frac{\omega}{c} \frac{n_2}{A_{\mathit{eff}}} = \frac{2\pi}{\lambda} \frac{n_2}{A_{\mathit{eff}}} \qquad 2$$

Some embodiments operate near the zero-dispersion wavelength $\lambda_0$, and the propagation constant can be expanded as:

$$\Delta \kappa = -\frac{\lambda^2}{2\pi c}\left[\frac{dD}{d\lambda}\bigg|_{\lambda_0}(\lambda_p - \lambda_0)\right]\Omega^2 \qquad 3$$

where $$\Omega = \omega_p - \omega_s = \omega_a - \omega_p. \qquad 4$$

Figure 5:
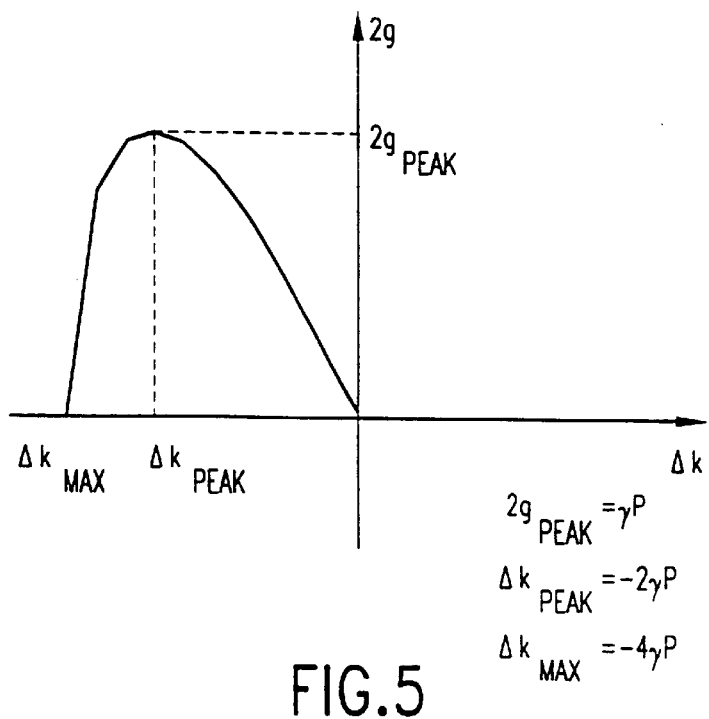
FIG. 5 is a graphical illustration that plots power gain coefficient 2g versus phase vector mismatch $\Delta k$ for parametric amplification.

The pump wavelength can falls in the normal dispersion regime for some embodiments, and D<0, ∂D/∂λ>0, ($\lambda_p-\lambda_0$) <0, so that Δk>0. In this case, g can be imaginary, and there may be no gain during the sideband generation process. This can correspond to the case of 4WM. Some embodiments operate in the anomalous group velocity dispersion regime, and D>0, ∂D/∂λ>0, ($\lambda_p-\lambda_0$)>0, so that Δk<0. This can be the regime of PA, and the nonlinearity helps to reduce the phase mismatch (i.e., the two parts in the second term in Equation (1) are of opposite sign). There can be gain for PA, and the gain can be tunable with the pump power. For example, the power gain coefficient 2g is plotted schematically in FIG. 5 for operation in the anomalous group velocity regime. The peak gain ($g_{peak}=\gamma P$) can occur at $\Delta k_{peak}=-2\gamma P$. The range over which the gain exists can be given by 0>Δk>−4γP in some embodiments. Thus, the peak gain can be proportional to the pump power, and the Δk range can be determined by the pump power.

Consequently, from Equation (2) the bandwidth can be increased by increasing the pump power, increasing the nonlinear coefficient $n_2$ or decreasing the effective area $A_{\mathit{eff}}$. In other embodiments, for a given required frequency range over which gain is required, the pump requirements can be reduced by increasing the effective nonlinearity ($n_2/A_{\mathit{eff}}$).

Several embodiments lead to broadband gain for cascaded Raman amplification by arranging at least one intermediate Raman cascade order at close proximity to the zero-dispersion wavelength $\lambda_0$ (e.g., within ±5 nm of $\lambda_0$ for some embodiments; within ±2 nm for other embodiments). Either 4WM (if $\lambda_r<\lambda_0$) or PA (if $\lambda_r>\lambda_0$) can lead to spectral broadening of that particular Raman order. In subsequent Raman orders the bandwidth can grow even further. In other embodiments, the cascade Raman wavelength $\lambda_r$ lies to the long wavelength side of $\lambda_0$ (i.e., in the anomalous dispersion regime), so that parametric amplification can occur.

Figure 6:
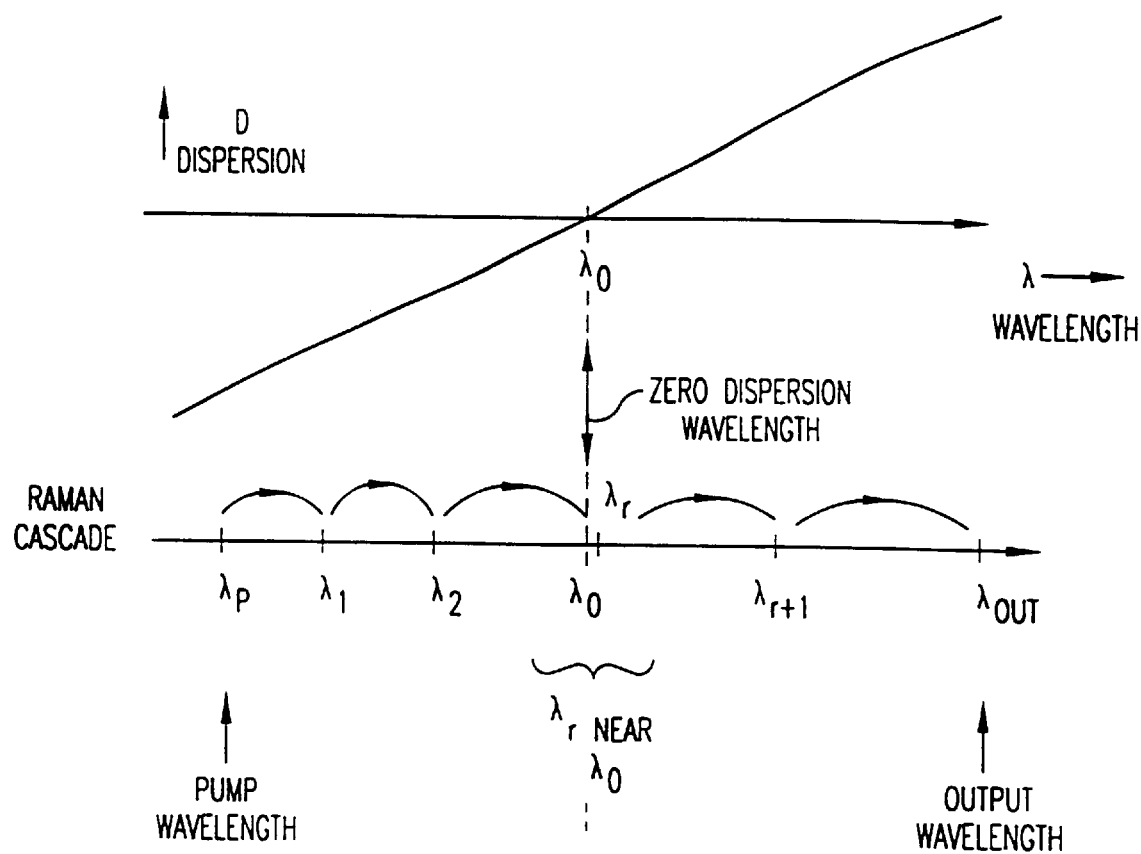
FIG. 6 is a schematic diagram of one embodiment of a nonlinear polarization amplifier of the present invention.

An embodiment of the broadband NLPA is illustrated in FIG. 6. Starting from the pump wavelength $\lambda_p$, cascaded Raman amplification can be used in the first few stages. The pump can be more than one Raman shift or 13.2 THz away from the zero-dispersion wavelength. To keep higher efficiency in these initial steps, some embodiments can use a narrow band cavity design, such as designs based on gratings or wavelength selective couplers.

Some embodiments broaden the gain bandwidth by positioning one of the intermediate Raman cascade orders at a close proximity to the zero-dispersion wavelength $\lambda_0$. By operating close to $\lambda_0$, it can almost automatically phase-match either 4WM or PA. In the subsequent cascaded Raman orders, the gain bandwidth may continue to broaden. This occurs because the effective gain bandwidth of Raman is the convolution of the bandwidth of the pump (in this case, the previous Raman cascade order) with the Raman gain curve. In some embodiments with Raman amplification, the gain spectrum follows the pump spectrum. As the pump wavelength changes, the Raman gain can change as well, separated by the distance of optical phonon energy which in silica fibers is an approximately 13.2 THz down-shift in frequency.

If the fiber is conventional so-called standard fiber, then zero-dispersion wavelength $\lambda_0$ can be about 1310 nm. For dispersion-shifted fiber, the zero-dispersion wavelength $\lambda_0$ can shift to longer wavelengths by adding waveguide dispersion. In other embodiments, a dispersion-flattened fiber can be used for low dispersion values over one or more of the Raman cascade orders. In some embodiments with dispersion-flattened fiber, the dispersion slope can be small, so the gain bandwidth can be even larger (c.f. Equations (1) and (3)).

The Raman gain spectrum can follow the pump spectrum, such as when there is nothing in the Raman cavity to restrict the bandwidth of the subsequent orders. For these higher cascade order Raman laser schemes, some embodiments use gratings or wavelength selective couplers. Other embodiments with the broadband cavity design of the Sagnac Raman amplifier and laser can have increased bandwidth with a tailored pump spectrum. A single-pass fiber design can constitute the broadest bandwidth design. A broadband cavity such as the Sagnac Raman cavity can have the feedback used to lower the threshold and the required pump power. Broadening the bandwidth can lead to a drop in efficiency, so the pump powers can be higher for the broadband cavity designs.

Cascaded Raman amplification can reach the 1430–1530 nm range of the low-loss window. Pumping can occur with a commercially available cladding-pumped fiber laser, which operates around 1060 to 1140 nm. The various Raman orders, each separated by 13.2 Thz from the previous order, are set forth in Table 1.

TABLE 1

Various Raman orders when pumping between 1060 and 1140 nm (seperation of 13.2 THz between orders)

| Wavelength (nm) | Δλ | Wavelength (nm) | Δλ |
|---|---|---|---|
| 1060.00 | 51.86 | 1110.00 | 57.00 |
| 1111.86 | 57.19 | 1167.00 | 63.17 |
| 1169.05 | 63.39 | 1230.16 | 70.40 |
| 1232.44 | 70.66 | 1300.56 | 78.94 |
| 1303.11 | 79.26 | 1379.50 | 89.14 |
| 1382.37 | 89.53 | 1468.64 | 101.46 |
| 1471.90 | 101.93 | 1570.10 | 116.52 |
| 1573.82 | 117.09 | 1686.62 | 135.20 |
| 1070.00 | 52.86 | 1117.00 | 57.74 |
| 1122.86 | 58.36 | 1174.74 | 64.03 |

TABLE 1-continued

Various Raman orders when pumping between 1060 and 1140 nm (seperation of 13.2 THz between orders)

| Wavelength (nm) | Δλ | Wavelength (nm) | Δλ |
|---|---|---|---|
| 1181.22 | 64.76 | 1238.77 | 71.41 |
| 1245.98 | 72.27 | 1310.18 | 80.15 |
| 1318.25 | 81.17 | 1390.33 | 90.59 |
| 1399.42 | 91.82 | 1480.92 | 103.22 |
| 1491.25 | 104.72 | 1584.15 | 118.69 |
| 1595.97 | 120.54 | 1702.84 | 137.92 |
| 1080.00 | 53.88 | 1120.00 | 58.05 |
| 1133.88 | 59.54 | 1178.05 | 64.40 |
| 1193.42 | 66.14 | 1242.46 | 71.85 |
| 1259.56 | 73.90 | 1314.31 | 80.67 |
| 1333.47 | 83.11 | 1394.98 | 91.22 |
| 1416.58 | 94.16 | 1486.20 | 103.99 |
| 1510.74 | 107.57 | 1590.19 | 119.63 |
| 1618.32 | 124.07 | 1709.82 | 139.10 |
| 1090.00 | 54.91 | 1130.00 | 59.12 |
| 1144.91 | 60.74 | 1189.12 | 65.65 |
| 1205.65 | 67.54 | 1254.77 | 73.32 |
| 1273.19 | 75.56 | 1328.10 | 82.43 |
| 1348.74 | 85.09 | 1410.53 | 93.33 |
| 1433.83 | 96.55 | 1503.86 | 106.56 |
| 1530.38 | 110.49 | 1610.42 | 122.81 |
| 1640.87 | 127.69 | 1733.24 | 143.09 |
| 1100.00 | 55.95 | 1140.00 | 60.20 |
| 1155.95 | 61.94 | 1200.20 | 66.92 |
| 1217.89 | 68.96 | 1267.12 | 74.82 |
| 1286.85 | 77.24 | 1341.93 | 84.21 |
| 1364.09 | 87.10 | 1426.14 | 95.48 |
| 1451.19 | 98.98 | 1521.62 | 109.18 |
| 1550.17 | 113.47 | 1630.81 | 126.07 |
| 1663.64 | 131.40 | 1756.87 | 147.19 |

To obtain gain between 1430 nm and 1520 nm, the pump can be operated between 1090 nm and 1140 nm, and five cascaded Raman orders can be used to reach the desired wavelength. To make use of the broadening from PA or 4WM, a pumping scheme can be selected in the middle of this range, i.e., starting with a PUMP wavelength of 1117 nm. Then, the various Raman orders land at approximately 1175 nm, 1240 nm, 1310 nm, 1390 nm and finally 1480 nm. In particular, the third Raman frequency (1310 nm) passes through the zero-dispersion point of a standard fiber, and the next order (1390 nm) can be close if the fiber is dispersion shifted. A broadband gain can be expected for wavelengths in the 1430–1530 nm range centered around 1480 nm by using a fiber with a standard dispersion and a pump wavelength of 1117 nm, 1175 nm or 1240 nm.

Figure 7:
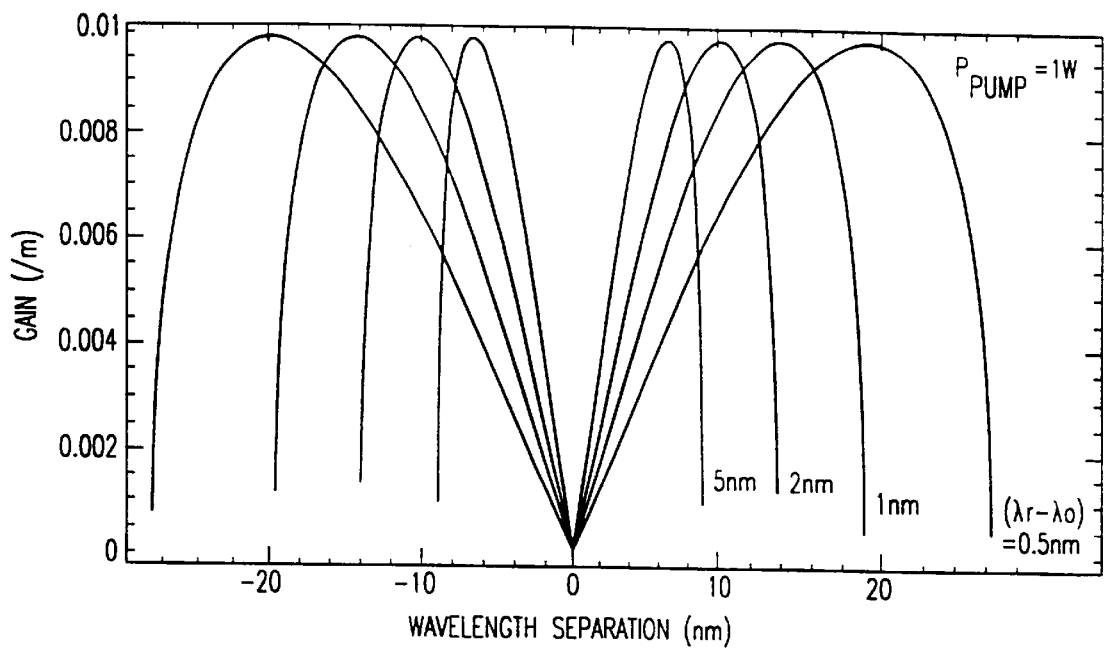
FIG. 7 is a graphical illustration of spectral broadening and gain expected from parametric amplification for a pump power of 1 W and different separations between the pump and zero-dispersion wavelength.
Figure 8:
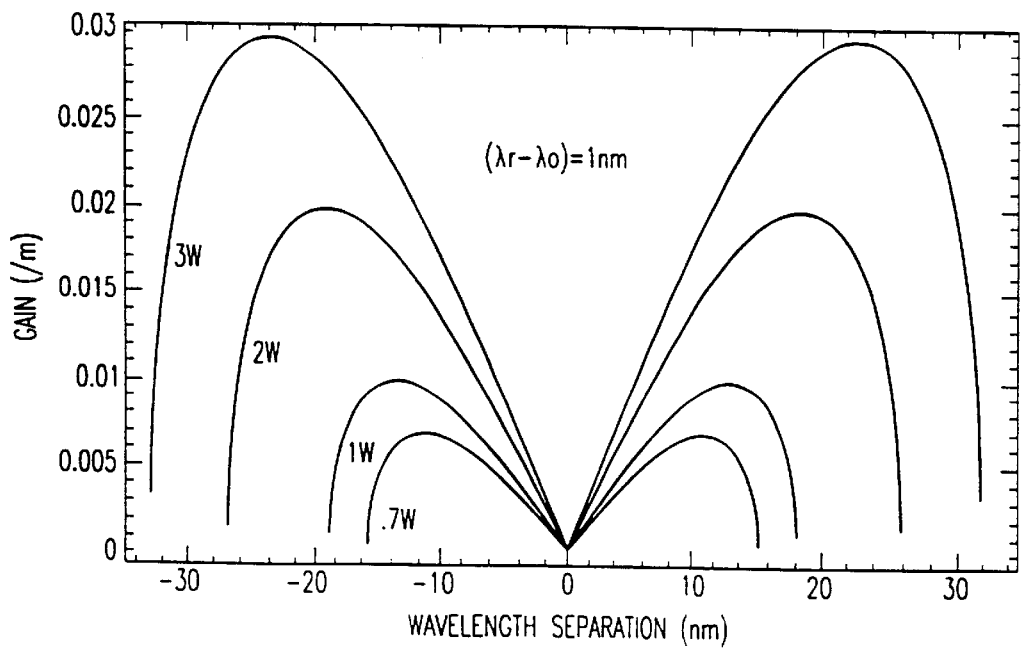
FIG. 8 is a graphical illustration of spectral broadening and gain expected from parametric amplification for a pump and zero-dispersion wavelength separation of 1 nm and for varying pump powers.

Broadening can be expected from PA. A standard fiber can be used and the pump wavelength can start at 1117 nm. The calculations use Equations (1–4) with the following typical parameters for high-Raman cross-section fiber in some embodiments: $\lambda_o=1310$ nm, $\gamma=9.9$ $W^{-1}km^{-1}$, and a dispersion slope of 0.05 ps/nm-km. In FIG. 7, the gain coefficient for PA is plotted versus wavelength at a pump power of 1 W and wavelength separations $(\lambda_r-\lambda_o)$ of 0.5, 1, 2 and 5 nm. For a wavelength separation of 2 nm, the PA peak gain occurs at ±10 nm, so the spectral broadening is over 20 nm. The closer the pump wavelength approaches the zero-dispersion wavelength, the wider the gain bandwidth can be. In addition, FIG. 8 plots the gain versus wavelength for a separation of $(\lambda_r-\lambda_o)=1$ nm and pump powers of 0.7, 1, 2, and 3 W. The peak gain can increase directly proportionally to the pump power, while the bandwidth can increase as the square root of pump power.

Figure 9:
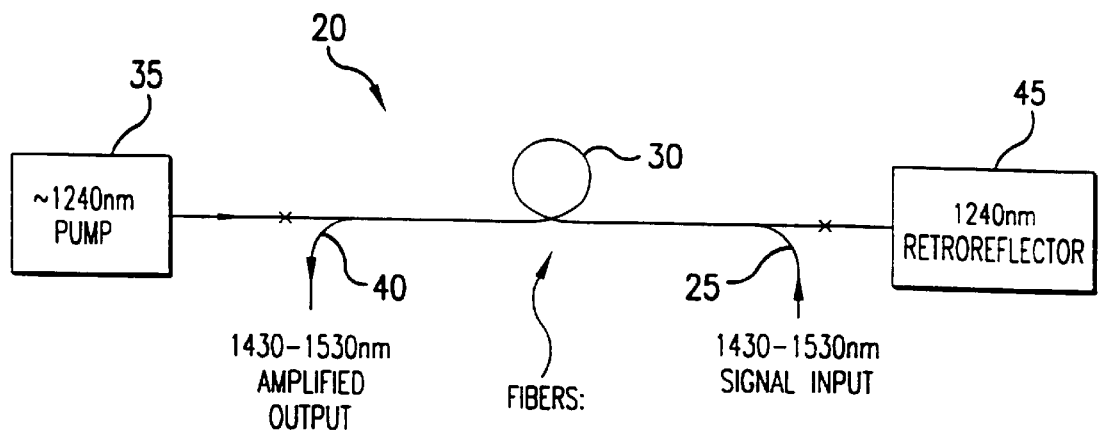
FIG. 9 is a schematic diagram of an embodiment of a broadband fiber transmission system of the present invention using an open-loop configuration.
Figure 9A:
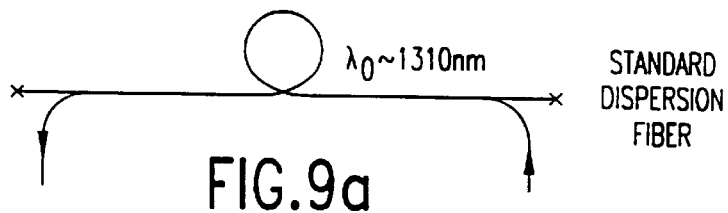
Figure 9B:
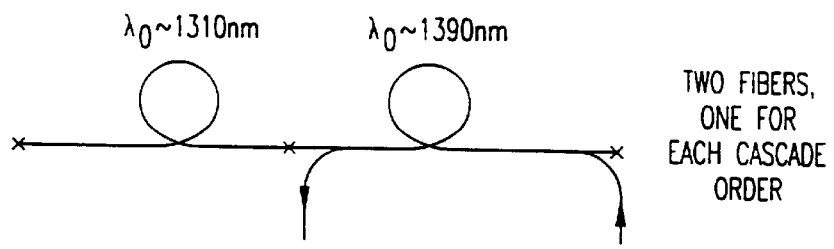
Figure 9C:
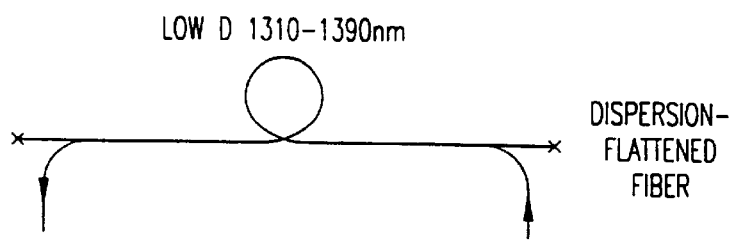

FIG. 9 shows a first embodiment which uses an open-loop design to produce an amplified broadband signal for a range of wavelengths between 1430 nm and 1530 nm. The open-loop design is a nonlinear polarization amplifier, and may have a high pump power requirement. In the NLPA amplifier 20 as illustrated in FIG. 9, an optical signal having a wavelength between 1430 nm and 1530 nm is input from an input port 25 to an optical fiber 30. The optical fiber 30 is pumped by a pumping light generated by a pumping laser 35 operated at a wavelength of about 1240 nm. The optical signal is amplified and spectrally broadened in the fiber by nonlinear polarization, and output through an output port 40. The configuration is so arranged that the optical signal can have a wavelength greater than the zero-dispersion wavelength of the fiber, which in turn is greater than the pumping wavelength of 1240 nm.

In this open-loop configuration, the fiber can have a cut-off wavelength below 1240 nm to be single-mode (spatial) over all wavelengths of the Raman cascade. Three choices of the fiber embodiments can be used in some embodiments. First, a standard dispersion fiber with a zero-dispersion wavelength at about 1310 nm. Second, two fibers spliced together with one fiber having a zero-dispersion wavelength at about 1310 nm (first cascade) and the other at 1390 nm (second cascade). Third, a dispersion-flattened fiber with low-dispersion at least between 1310 nm and 1390 nm. The reduced dispersion slope of such a dispersion-flattened fiber increases significantly the bandwidth for PA or 4WM.

Exemplary 1240 nm pump lasers include: (a) an 1117 nm cladding-pumped fiber laser followed by a coupler-based or grating-based Raman oscillator cavity (with gratings for 1117 nm, 1175 nm and 1240 nm); (b) an optically-pumped semiconductor laser; or (c) a chromium-doped forsterite laser. At one end of the fiber, a 1240 nm retro-reflector 45 can be placed to increase pumping conversion efficiency. The retro-reflector can be a dichroic mirror or a 1240 nm grating. The input and output ports can be WDM couplers, and isolators can be used at the input and output ports to prevent lasing due to spurious feedback. A counter-propagating geometry can average out noise fluctuations in this open-loop configuration. A co-propagating geometry can be used.

Figure 10:
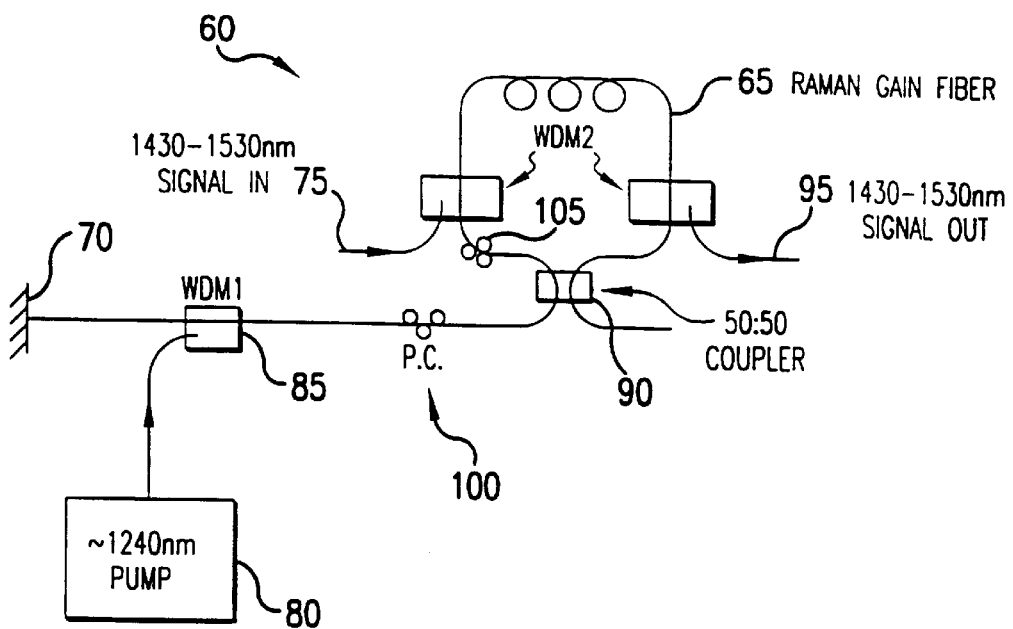
FIG. 10 is a schematic illustration of a broadband fiber transmission system of the present invention using a Sagnac Raman cavity that is pumped at 1240 nm.

To reduce the pump power requirements, a broadband cavity such as the Sagnac Raman cavity can be used in some embodiments. FIG. 10 illustrates an embodiment of the NLPA that uses a Sagnac Raman cavity design with a 1240 nm pump. Referring to FIG. 10, the Sagnac Raman cavity of the NLPA 60 can be formed by a broadband mirror 70 and a loop mirror comprising a Raman gain fiber 65 and an optical coupler 90 connected thereto. An optical signal can have a wavelength between 1430 nm to 1530 nm input through an input port 75 to the Raman gain fiber 65. A pumping laser 80 can operate at a wavelength 1240 nm and generate a pumping light that pumps the fiber 65 through a coupler 85. The optical signal can be amplified and spectrally broadened in the fiber by nonlinear polarization, and output through an output port 95. The configuration can be arranged so that the optical signal has a wavelength greater than the zero-dispersion wavelength of the fiber, which in turn can be greater than the pumping wavelength of 1240 nm.

The Raman gain fiber can have the same characteristics as described above for the open-loop design. Similarly, the pumping lasers used in the first embodiment can be used in this second embodiment. The broadband NLPA may further include a polarization controller 100 in the Sagnac Raman cavity for controlling polarization state. In other embodiments, if the fiber is polarization maintained, the polarization controller can be unnecessary. The optical coupler 90 is nominally 50:50 at least for the optical signal having a wavelength between about 1240 nm and 1430 nm. The coupler 85 can be a WDM coupler which transmits at least at a wavelength between about 1300 nm and 1430 nm. The input port and output port each comprises a WDM coupler which can transmit at least at a wavelength between about 1240 nm and 1425 nm. One embodiment of the Sagnac Raman cavity has a passive noise dampening property that leads to quieter cascading of various Raman orders.

Figure 11:
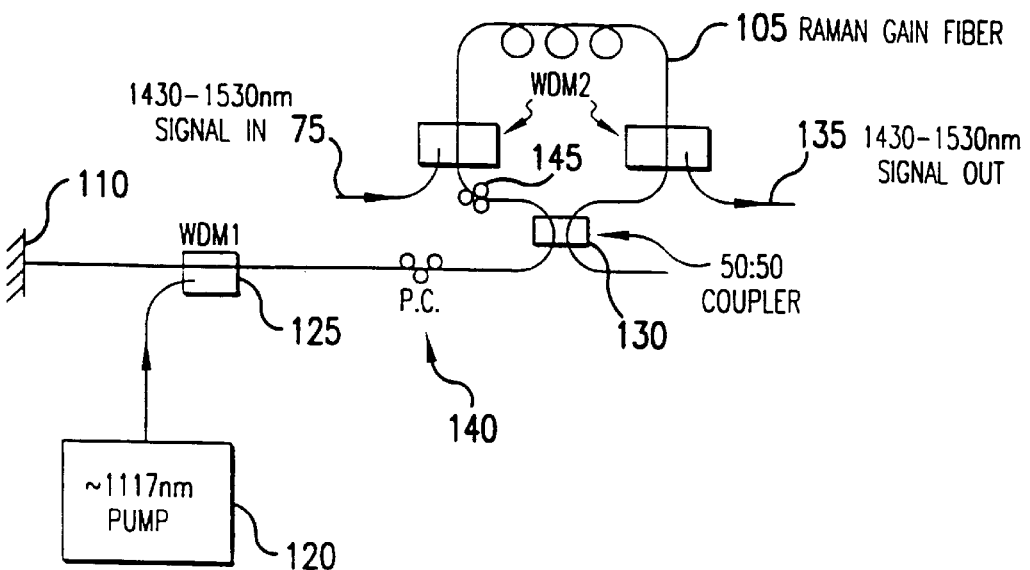
FIG. 11 is a schematic illustration of an embodiment of a broadband fiber transmission system of the present invention using a Sagnac Raman cavity that is pumped at 1117 nm.

In various embodiments, a Sagnac Raman cavity can be used for all five Raman cascade orders between 1117 nm and the low-loss window. FIG. 11 illustrates a third embodiment of a five-order Sagnac Raman amplifier for NLPA operation. A cladding-pumped fiber laser operating around 1117 nm can be used as a pumping laser 120. Different fiber combinations embodiment can be used. The fibers can have a cut-off wavelength below 1117 nm to accommodate single-mode operation for the pump. An optical coupler 130 can be nominally 50:50 at least for the optical signal having the wavelength between about 1117 nm and 1430 nm. A coupler 125 can be a WDM coupler which transmits at least at wavelengths between about 1165 nm and 1430 nm. Moreover, the input and output ports each comprises a WDM coupler which can transmit at least at wavelengths between about 1117 nm and 1425 nm. Although the wavelength range of the various components increases, this configuration can lead to an even broader gain band since the pump bandwidth is allowed to increase even during the first two cascades between 1117 nm and 1240 nm for some embodiments. Also, the noise dampening property of the Sagnac cavity can be used over all five Raman orders for some embodiments.

Some embodiments include an NLPA. An optical signal having a wavelength $\lambda$ is input through an input port into a distributed gain medium having zero-dispersion at a wavelength $\lambda_0$, such as an optical fiber, which can be pumped by a pumping light from a pump source operated at a wavelength $\lambda_p$, wherein $\lambda \geq \lambda_0 \geq \lambda_p$. The pumping light can cascade through the distributed gain medium a plurality of Raman orders including an intermediate order having a wavelength $\lambda_r$ at a close proximity to the zero-dispersion wavelength $\lambda_0$ to phase match four-wave mixing (if $\lambda_r < \lambda_0$) or parametric amplification (if $\lambda_r > \lambda_0$). The amplified and spectrally broadened optical signal is output through an output port.

The above embodiments demonstrate that a single NLPA can accommodate the full bandwidth of the low-loss window. Moreover, the full bandwidth of the low-loss window may be reached by using a parallel optical amplification apparatus having a combination of two or more Raman amplifiers and rare earth doped amplifiers. In some embodiments, the NLPAs and EDFAs are used.

Figure 12:
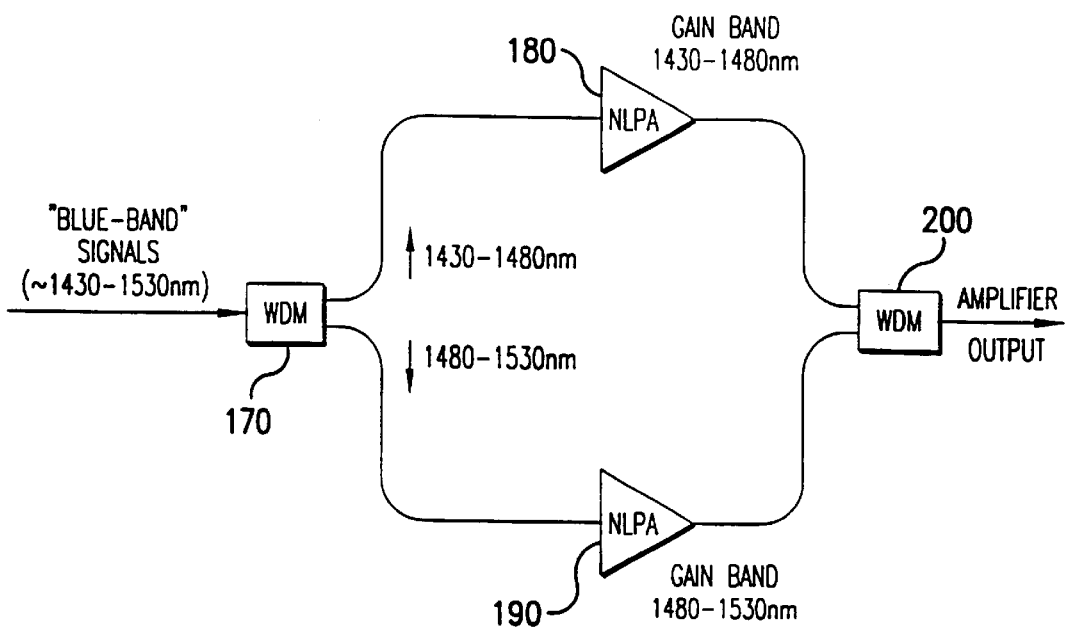
FIG. 12 is a schematic illustration of an embodiment of a broadband fiber transmission system of the present invention with two stages of nonlinear polarization amplifiers.

FIG. 12 shows a first embodiment of the parallel optical amplification apparatus using a combination of two NLPAs for a range of wavelengths between 1430 nm and 1530 nm. Referring to FIG. 12, a divider 170 divides an optical signal having a wavelength between 1430 nm to 1530 nm at a predetermined wavelength, such as 1480 nm, into a first beam having a wavelength less than the predetermined wavelength and a second beam having a wavelength greater than the predetermined wavelength in some embodiments. The first beam is input into a first NLPA 180 for amplification and spectral broadening therein. The second beam is input into a second NLPA 190 for amplification and spectral broadening therein. Outputs from the first and second NLPAs can be combined by a combiner 200 to produce an amplified and spectrally broadened optical signal. The input port 170 and output port 200 can be preferably WDM couplers in some embodiments.

In other embodiments the first NLPA 180 can be optimized for 1430–1480 nm and centered at 1455 nm, while the second NLPA can be optimized for 1480–1530 nm and centered at 1505 nm. From Table 1, these two windows can be achieved in a five-order cascade by starting with a pump wavelength of about 1100 nm for the short-wavelength side and a pump wavelength of about 1130 nm for the long-wavelength side. For the short-wavelength side, the fiber can have a zero-dispersion around 1365 nm, while for the long-wavelength side, the fiber zero-dispersion can be around 1328 nm or 1410 nm.

The narrower-bandwidth for each NLPA can lead to an increased efficiency for each amplifier in some embodiments. Furthermore, the components may be more easily manufactured, since the wavelength window is not as large. The multiple amplifiers in some embodiments may allow for gradual upgrades of systems, adding bandwidth to the EDFA window as needed.

Figure 13:
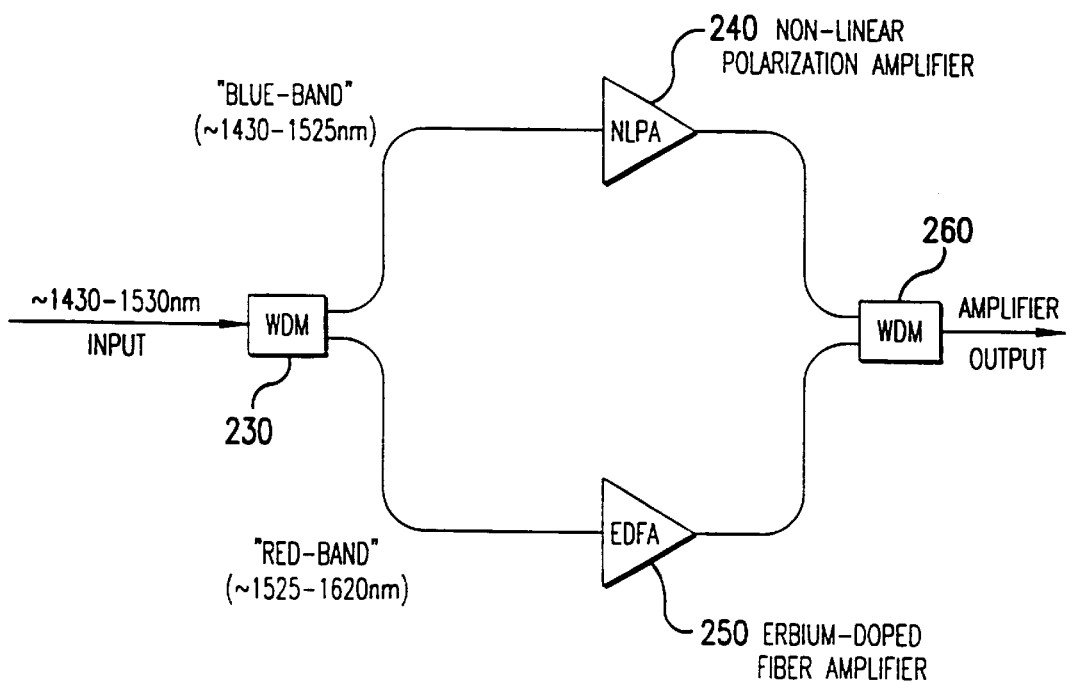
FIG. 13 is a schematic illustration of an embodiment of a broadband fiber transmission system of the present invention that is a combination of an EDFA and a nonlinear polarization amplifier.

A spectrum of 1430–1620 nm in the low-loss window can be amplified and spectrally broadened by using a parallel optical amplification apparatus comprising Raman amplifiers and rare earth doped amplifiers. FIG. 13 describes a second embodiment of the parallel optical amplification apparatus. The amplification apparatus comprises a broadband NLPA 240 and a EDFA 250. A divider 230 of the apparatus divides an optical signal having a wavelength between 1430 nm and 1620 nm at a predetermined wavelength, preferably at 1525 nm, into a first beam having a wavelength less than the predetermined wavelength and a second beam having a wavelength greater than the predetermined wavelength in some embodiments. The broadband NLPA 240 receives the first beam and produces an amplified broadband first beam. The EDFA 250 receives the second beam and produces an amplified broadband second beam. A combiner 260 combines the amplified and spectrally broadened first and second beams to produce an amplified broadband optical signal. Other embodiments can have WDM couplers for the divider 230 and the combiner 260.

To use some embodiments with multi-wavelength WDM channels, at the output of the amplifier, gain can be equalized. This wavelength dependency or nonuniformity of the gain band can have little impact on single-channel transmission. However, it can render the amplifier unsuitable for multichannel operation through a cascade of amplifiers. As channels at different wavelengths propagate through a chain of amplifiers, they can accumulate increasing discrepancies between them in terms of gain and signal-to-noise ratio. Using gain-flattening elements can significantly increase the usable bandwidth of a long chain of amplifiers. For example, the NLPA can be followed by a gain flattening element to provide gain equalization for different channels in some embodiments. Alternately, the gain flattening element could be introduced directly into the Sagnac interferometer loop in other embodiments, such as in FIG. 10 or 11.

The wavelength range where hybrid amplifiers with DRA's are to be used, can be considered to facilitate future upgrades in bandwidth. DRA's used in the C-band (1530–1565 nm) or L-band (1570–1610 nm) can restrict opening up the S-band (1480–1530 nm) or S$^+$ band (1430–1480 nm). DRA's can use pump bands that are 13.2 THz, or about 100 nm, shorter in wavelength than the signal band. For the C- or L-bands, DRA's can have pumps that lie in the wavelength range between 1430–1510 nm. The pump bands can be at a shorter wavelength than any signal band.

The pump might deplete energy from the signal channels through the Raman process.

In embodiments where fiber bandwidth exceeds 100 nm, DRA can be inconsistent with further band expansion. For example, DRA's for C- and L-bands can prevent using the S- and S+-bands in the fiber in some embodiments. The pumps for DRA can lie at shorter wavelength than any signal band. To maximize the capacity of the fiber in some embodiments DRA's can be used at the shortest bands to be used in the fiber.

DRA's can be useful when the fiber loss increases in some embodiments. For example, when the fiber loss increases >0.03 dB/km from the minimum loss (i.e., for an 80 km link that would mean an additional loss of 2.4 dB), then the span design can be more difficult in some embodiments. The higher loss means that higher gain can be used for a fixed amplifier spacing, which can mean that more noise can be introduced. In turn, this can mean that the signal power can be increased or the bit-rate reduced to maintain the overall SNR. If hybrid amplifiers can be used in these higher loss windows, the improved NF can be used to offset the drawbacks from the higher loss.

Figure 14:
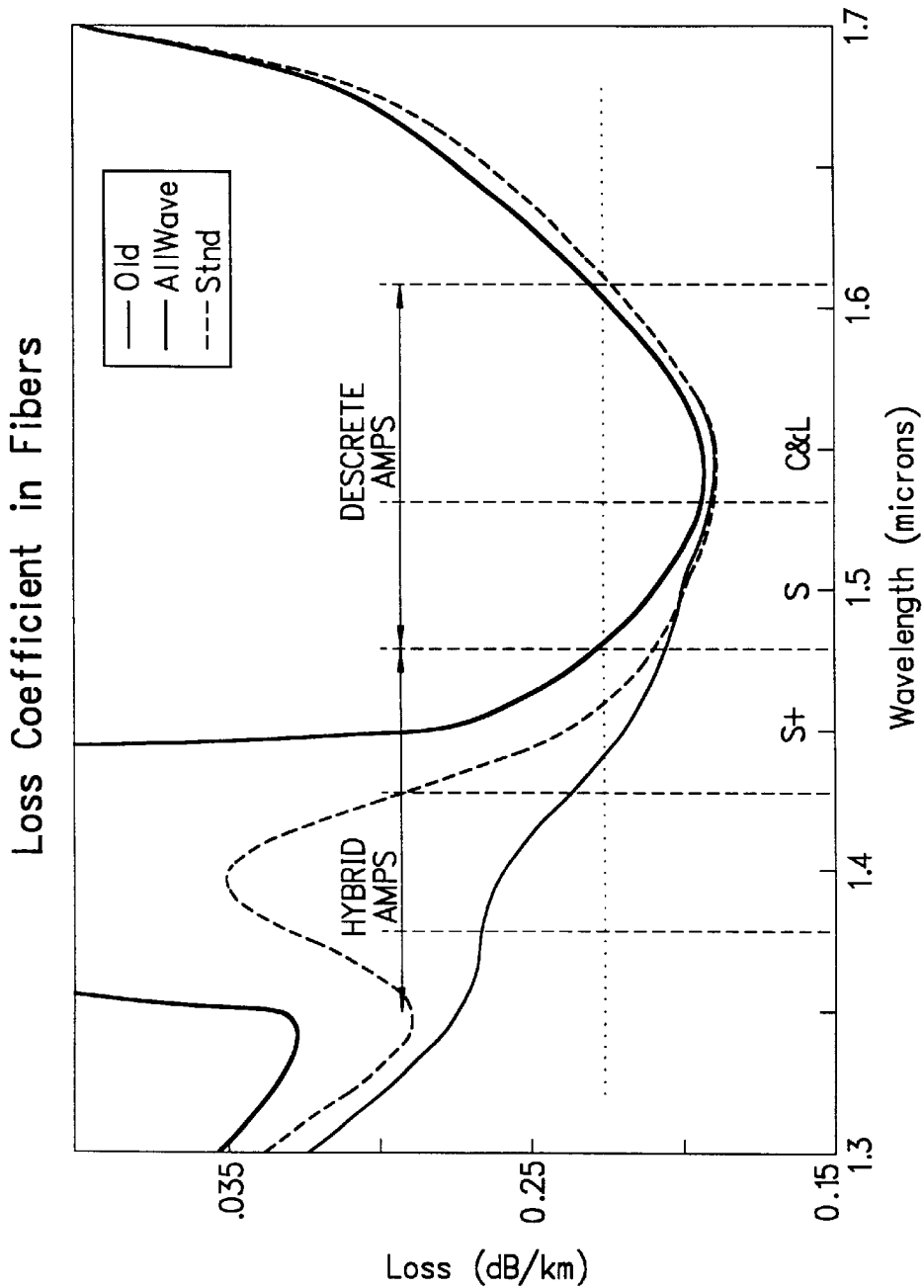
FIG. 14 is a graph of loss versus wavelengths comparing the wavelength range over which hybrid and discrete amplifiers can be operated.

FIG. 14 shows the loss coefficient (in dB/km) for three generations of fibers. The loss above 1600 nm can be due to infrared absorption, while the gradual increase in loss below 1550 nm can be due to Rayleigh scattering. The peak near 1390 nm can result from water absorption of OH bonds. With some newer fibers, the fibers can be dried better, so the water peak can be reduced. Also represented in FIG. 14 are different bands. The C- and L-bands can stretch from approximately 1530–1610 nm, the S-band from 1480–1530 nm, and the S+ band from 1430–1480 nm. For some embodiments of fiber types, the loss in the S-band can be lower or equal to the loss in the C- and L-bands. Since these three bands can be the lowest loss bands, discrete amplifiers can be used in these bands in some embodiments. For example, the C- and L-bands can use discrete EDFA's, while the S-band can use Raman amplifiers.

In the S+ band and shorter (i.e., wavelengths shorter than 1480 nm), the loss can rise above the loss in the C- and L-bands due to Rayleigh scattering and the water absorption. The S+ band and shorter wavelengths can advantageously use DRA's in some embodiments. Since these bands can be on the shortest wavelength side, DRA's may not block further expansion of the bands in some embodiments. The loss in the shorter wavelengths can be too high for these wavelengths to be used in long-haul communications in some embodiments. Also, for some embodiments with DRA's used in the wavelength range just beyond the water absorption peak (i.e., wavelengths between 1430–1480 nm), the pumps can be at wavelengths approximately 1340–1380 nm, just below the water peak.

FIGS. 15(a), 15(b), 16(a) and 16(b) illustrate various embodiments with an amplifier module incorporated into a broadband transmission system that operates in multiple wavelength bands. Discrete amplifiers can be used in the C, L, S bands, and combinations thereof. A distributed Raman amplifier or hybrid amplifier can be used for the S+ band.

Figure 15A:
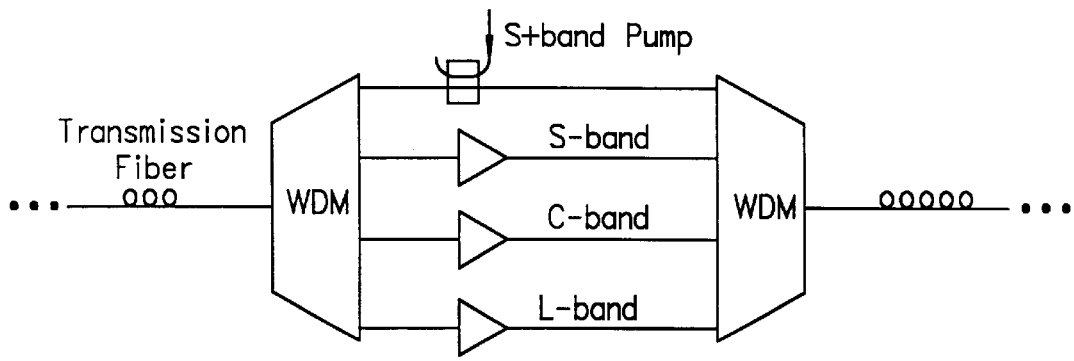
FIG. 15(a) is a schematic diagram of an embodiment of a multi-band amplifier module using a single WDM to split or combine the bands and distributed Raman amplification in the S+ band.
Figure 15B:
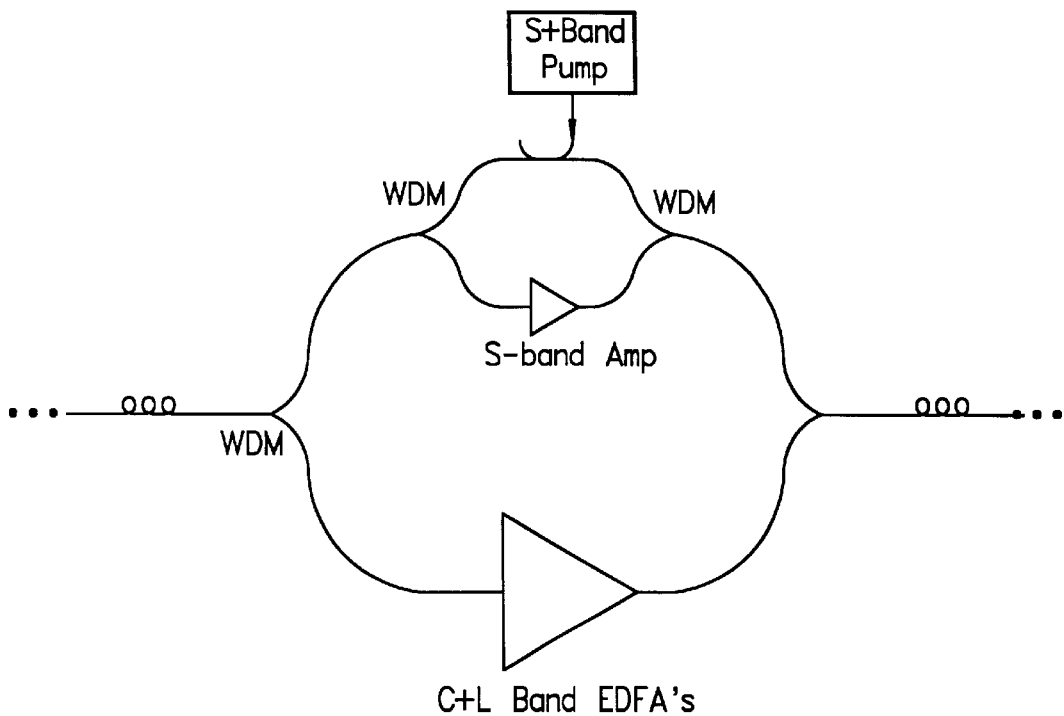
FIG. 15(b) is a schematic diagram of an embodiment of a multi-band amplifier module using multiple WDM's to split or combine the bands and distributed Raman amplification in the S+ band.

In FIGS. 15(a) and 15(b) a pump is introduced in parallel with these discrete amplifiers to implement various embodiments of a distributed Raman amplifier in the S+ band. In FIG. 15(a) a single WDM is used to split up the multiple bands while in FIG. 15(b) a serial combination of WDM's is used to split and combine the bands.

Figure 16A:
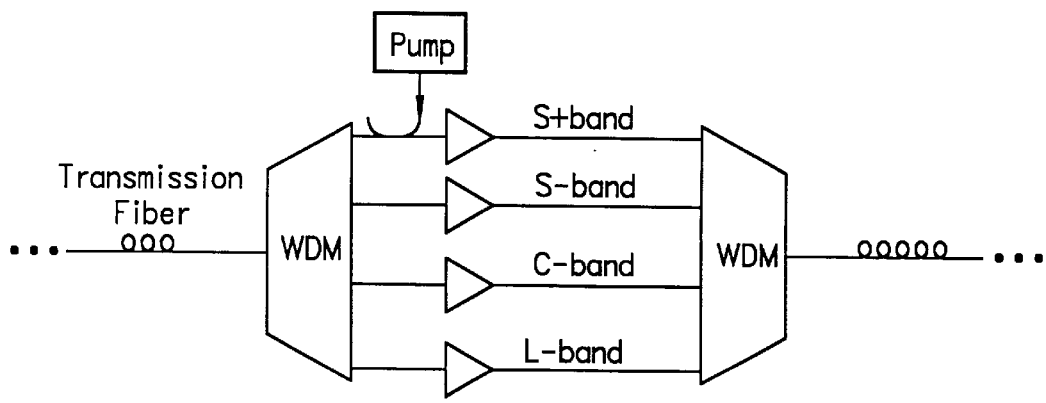
FIG. 16(a) is a schematic diagram of an embodiment of a multi-band amplifier module using a single WDM to split or combine the bands and hybrid amplification in the S+ band.
Figure 16B:
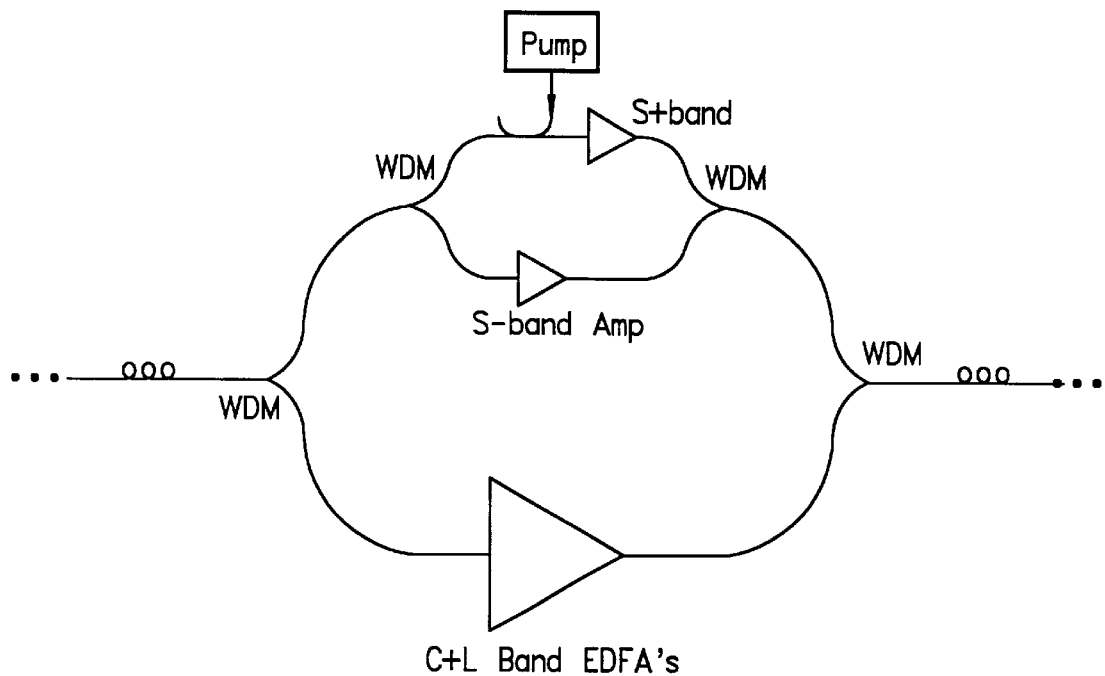
FIG. 16(b) is a schematic diagram of an embodiment of a multi-band amplifier module of the present invention using multiple WDM's to split or combine the bands and hybrid amplification in the S+ band.
Figure 17:
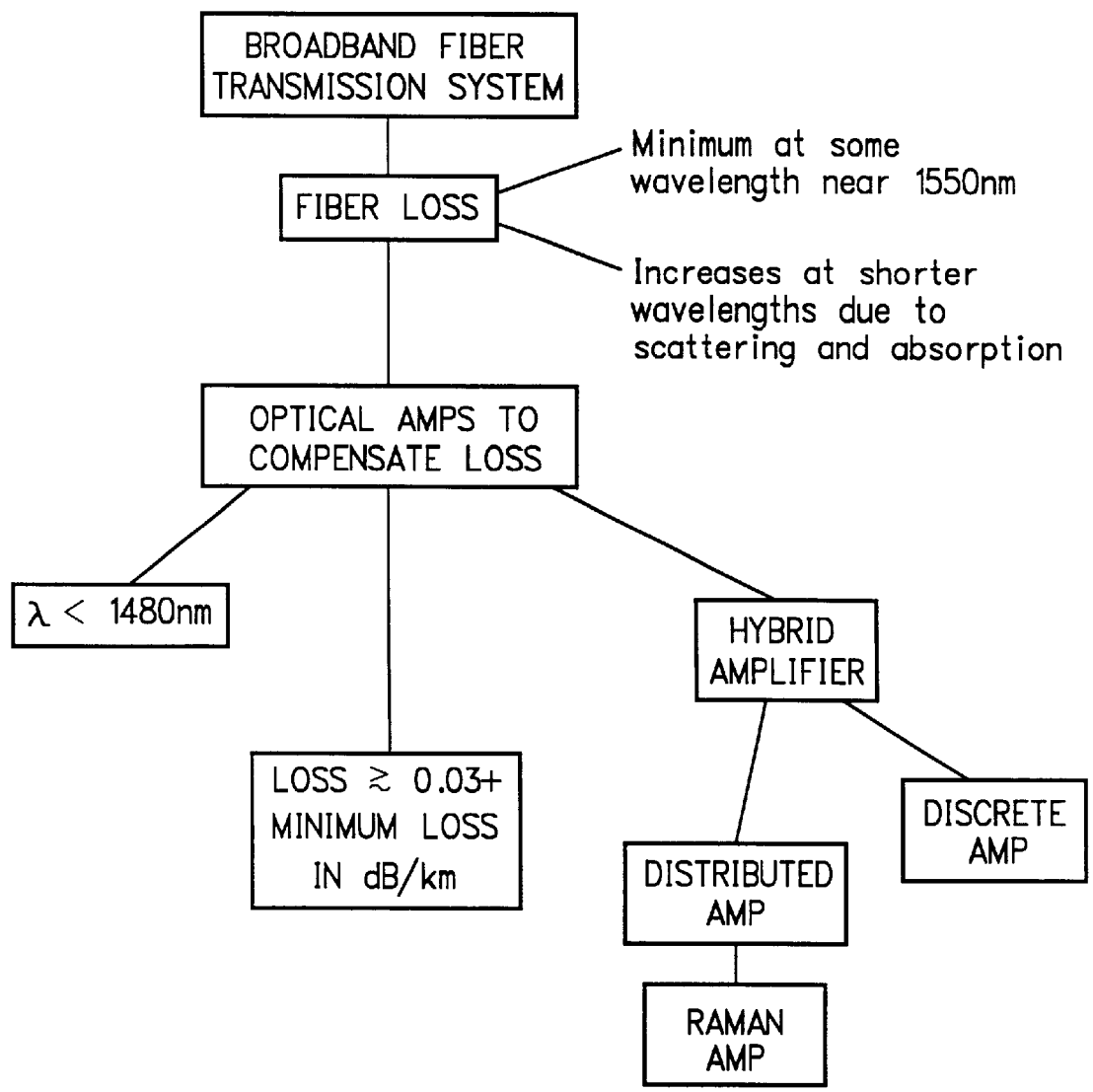
FIG. 17 is a block chart of various embodiments of uses of amplifiers.

In FIGS. 16(a) and 16(b) a pump is introduced in parallel with these discrete amplifiers to implement embodiments of a hybrid Raman amplifier in the S+ band. In FIG. 16(a) a single WDM is used to split up the multiple bands while in FIG. 16(b) a serial combination of WDM's is used to split and combine the bands.

In another embodiment, a broadband fiber transmission system is provided with low noise hybrid optical amplifiers to compensate for loss at wavelength of 1480 nm or less or that have a fiber loss of 0.03 dB/km or more above the minimum loss of the fiber. One embodiment provides a broadband fiber transmission system with low noise distributed optical amplifiers to compensate for loss at wavelength of 1480 nm or less or that have a fiber loss of 0.03 dB/km or more above the minimum loss of the fiber. Additionally, another embodiment is a broadband fiber transmission system with low noise discrete optical amplifiers to compensate for loss at wavelength of 1480 nm or less or that have a fiber loss of 0.03 dB/km or more above the minimum loss of the fiber. A further embodiment is a broadband fiber transmission system with low noise hybrid optical amplifiers to compensate for loss at wavelengths of 1400 to 1480 nm.

DRA's can improve the NF of an optical amplifier in some embodiments. For maximum fiber capacity, hybrid amplifiers can be used in the shortest wavelength bands in some embodiments, where the fiber loss is rising. For example, at wavelengths shorter than 1480 nm where the loss is at least 0.03 dB/km higher than at the loss minimum, hybrid amplifiers can be valuable. Discrete amplifiers in the C-, L- and S-bands and hybrid amplifiers in the S+ or shorter wavelength bands, can expand the fiber bandwidth beyond 120 nm.

One embodiment of a method of producing an amplified broadband optical signal in a transmission system comprises dividing an optical signal at a predetermined wavelength into a first beam having a wavelength less than the predetermined wavelength and a second beam having a wavelength greater than the predetermined wavelength; directing the first beam to a transmission link in the transmission system that includes a distributed Raman amplifier operating in the wavelength range less than 1480 nm; directing the second beam to a second amplifier; and combining the first and second beams to produce an amplified broadband optical signal. The second amplifier can be a Raman amplifier, a rare earth doped fiber amplifier, a thulium doped fiber amplifier, and/or an erbium doped fiber amplifier.

One embodiment of a broadband amplifier comprises a transmission fiber, a splitter, an S+ band distributed amplifier, a second optical amplifier, a combiner, and an output fiber. The splitter can be coupled to the transmission fiber. The splitter can split an optical signal into at least a first wavelength and a second wavelength. The splitter can direct the first wavelength to the S+ band distributed Raman amplifier. The splitter can direct the second wavelength to the second optical amplifier. The S+ band distributed Raman amplifier can be coupled to the splitter. The splitter can operate in the range less than 1480 nm. A pump power of the S+ band distributed Raman amplifier can extend into the transmission fiber. The S+ band distributed Raman amplifier can be a portion of the transmission fiber. The transmission fiber can incorporate a distributed gain medium. The second optical amplifier can be coupled to the splitter. The combiner can be coupled to the S+ band distributed Raman amplifier and/or the second optical amplifier. The combiner can combine an optical signal into at least a first wavelength and a second wavelength. The output fiber can be coupled to the combiner.

One embodiment of an S+ band amplifier comprises a distributed Raman amplifier, a WDM, a discrete amplifier, and a pump source. The distributed Raman amplifier can include a signal transmission line. At least a portion of the signal transmission line can incorporate a distributed gain medium. The WDM can be coupled to the signal transmission line. The discrete amplifier can be coupled to the WDM. The pump source can be coupled to the WDM. The pump source can produce a pump beam $\lambda_p$ at wavelengths less than 1400 nm. The distributed Raman amplifier can be a low noise pre-amplifier for the discrete amplifier.

One embodiment of an S+ band amplifier comprises a distributed Raman amplifier, a discrete amplifier, a WDM, and a pump source. The distributed Raman amplifier can include a signal transmission fiber. At least a portion of the signal transmission line can incorporate a distributed gain medium. The discrete amplifier can be coupled to the transmission line. Additional gain can be generated from the distributed Raman amplifier to compensate for a higher loss in the fiber when the fiber experiences a transmission loss of 0.03 dB/km greater than the transmission loss in the fiber at 1550 nm. The additional gain can be generated without adding a proportional amount of noise in the system. The WDM can be coupled to the signal transmission line. The WDM can be positioned between the distributed Raman amplifier and the discrete amplifier. The pump source can be coupled to the WDM. The pump source can produce a pump beam $\lambda_p$, which can be at wavelengths less than 1400 nm.

One embodiment of a method of producing an amplified broadband optical signal comprises providing at least one fiber that has a low loss window of 1430 to 1620 nm and a distributed Raman amplifier coupled to the fiber; operating the distributed Raman amplifier at wavelengths in the range less than 1480 nm; and generating an amplified signal at wavelengths less than 1480 nm. The low loss can be at least 2 dB/km, or at least 1 dB/km. The distributed Raman amplifier can be coupled to a discrete optical amplifier. The distributed Raman can be a low noise pre-amplifier for the discrete optical amplifier. The distributed Raman amplifier can have a pump power that extends into a transmission line fiber. The discrete optical amplifier can be a Raman amplifier, a rare earth doped amplifier, an erbium doped fiber amplifier, and/or a thulium doped fiber amplifier.

One embodiment of a method of producing an amplified broadband optical signal comprises providing a distributed Raman amplifier with at least one fiber that has a low loss window of 1430 to 1620 nm and a third order non-linearity amplifier coupled to the fiber; operating the third order non-linearity amplifier at wavelengths in the range of less than 1480 nm; and generating an amplified signal at wavelengths less than 1480 nm. The low loss can be at least 2 dB/km, or at least 1 dB/km. The distributed Raman amplifier can be coupled to a discrete optical amplifier. The discrete optical amplifier can be a Raman amplifier, a rare-earth doped amplifier, an erbium doped fiber amplifier, and/or a thulium doped fiber amplifier.

One embodiment of a method of producing an amplified broadband optical signal comprises providing a distributed Raman amplifier with at least one fiber that has a low loss window of 1430 to 1620 nm and a third order non-linearity amplifier coupled to the fiber; operating the third order non-linearity amplifier at wavelengths in the range of less than 1480 nm; and generating an amplified signal in the wavelength range of less than 1480 nm. The third order non-linearity amplifier can be operated in a transmission system that uses at least 80 nm of bandwidth.

It is understood that various other modifications will be readily apparent to those skilled in the art without departing from the scope and spirit of the invention. Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

What is claimed is:

1. An optical amplifier, comprising:
   a distributed Raman amplifier that includes a signal transmission line wherein at least a portion of the signal transmission line comprises a distributed gain medium for the distributed Raman amplifier;
   a WDM coupled to the signal transmission line;
   a discrete Raman amplifier coupled in series to the WDM and the distributed Raman amplifier; and
   a pump source coupled to the WDM and producing a pump beam $\lambda_p$ at wavelengths less than 1400 nm;
   wherein a majority of signal wavelengths received by each of the distributed Raman amplifier and the discrete Raman amplifier are also received by the other of the distributed Raman amplifier and the discrete Raman amplifier; and
   wherein at least a portion of the signal transmission line comprises a zero dispersion wavelength $\lambda_0$, and wherein $\lambda_p$ is within thirty (30) nanometers of $\lambda_0$.

2. The amplifier of claim 1, wherein the distributed Raman amplifier is a low noise pre-amplifier for the discrete amplifier.

3. An optical amplifier, comprising:
   a distributed Raman amplifier that includes a signal transmission fiber wherein at least a portion of the signal transmission line comprises a distributed gain medium for the distributed Raman amplifier;
   a discrete Raman amplifier coupled in series to the distributed Raman amplifier, wherein additional gain is generated from the distributed Raman amplifier to compensate for a higher loss in the fiber when the fiber experiences a transmission loss of 0.03 dB/km greater than the transmission loss in the fiber at 1550 nm;
   a WDM coupled to the signal transmission line and positioned between the distributed Raman amplifier and the discrete Raman amplifier; and
   a pump source coupled to the WDM and producing a pump beam $\lambda_p$;
   wherein a majority of signal wavelengths received by each of the distributed Raman amplifier and the discrete Raman amplifier are also received by the other of the distributed Raman amplifier and the discrete Raman amplifier; and
   wherein at least a portion of the signal transmission line comprises a zero dispersion wavelength $\lambda_0$, and wherein $\lambda_p$ is within thirty (30) nanometers of $\lambda_0$.

4. The amplifier of claim 3, wherein the additional gain is generated without adding a proportional amount of noise in the system.

5. The amplifier of claim 3, wherein the pump beam $\lambda_p$ is at wavelengths less than 1400 nm.

6. The amplifier of claim 1, further comprising an additional amplifier stage parallel with at least the discrete Raman amplifier, wherein a majority of the signal wavelengths amplified by the additional amplifier stage are not amplified by the discrete Raman amplifier.

7. The amplifier of claim 1, wherein at least a portion of the signal transmission line comprises a zero dispersion wavelength $\lambda_0$, and wherein $\lambda_p$ is less than $\lambda_0$.

8. The amplifier of claim 1, wherein the pump source comprises at least one semiconductor laser.

9. The amplifier of claim 3, further comprising an additional amplifier stage coupled in parallel with at least the discrete Raman amplifier, wherein a majority of the signal wavelengths amplified by the additional amplifier stage are not amplified by the discrete Raman amplifier.

10. The amplifier of claim 3, wherein at least a portion of the signal transmission line comprises a zero dispersion wavelength $\lambda_0$, and wherein $\lambda_p$ is less than $\lambda_0$.

11. The amplifier of claim 3, wherein at least some of the signal wavelengths comprise wavelengths less than or equal to 1480 nanometers or greater than or equal to 1600 nanometers.

12. The amplifier of claim 3, wherein the pump source comprises at least one semiconductor laser.

13. An optical amplifier, comprising:
- a discrete Raman amplifier stage operable to be coupled to an installed signal transmission line;
- a WDM operable to be coupled between the discrete Raman amplifier and the signal transmission line;
- a pump source coupled to the WDM and producing a pump beam $\lambda_p$ comprising at least one wavelength less than 1400 nm, the WDM operable to introduce the pump beam into the signal transmission line;
- wherein at least a portion of the signal transmission line pumped by the pump beam forms a distributed Raman amplifier providing distributed Raman amplification to a plurality of signal wavelengths, and wherein at least a majority of the plurality of signal wavelengths received by each of the distributed Raman amplifier and the discrete Raman amplifier are also received by the other of the distributed Raman amplifier and the discrete Raman amplifier; and
- wherein at least a portion of the signal transmission line comprises a zero dispersion wavelength $\lambda_0$, and wherein $\lambda_p$ is within thirty (30) nanometers of $\lambda_0$.

14. The amplifier of claim 13, wherein at least a portion of the signal transmission line comprises a zero dispersion wavelength $\lambda_0$, and wherein $\lambda_p$ is less than $\lambda_0$.

15. The amplifier of claim 13, wherein the pump source comprises at least one semiconductor laser.

16. An optical amplifier, comprising:
- a discrete Raman amplifier stage operable to be coupled to an installed signal transmission line;
- a WDM operable to be coupled between the discrete Raman amplifier and the signal transmission line; and
- a pump source coupled to the WDM and producing a pump beam $\lambda_p$, the WDM operable to introduce the pump beam into the signal transmission line;
- wherein at least a portion of the signal transmission line pumped by the pump beam forms a distributed Raman amplifier providing distributed Raman amplification to a plurality of signal wavelengths wherein additional gain is generated from the distributed Raman amplifier to compensate for a higher loss in the fiber when the fiber experiences a transmission loss of 0.03 dB/km greater than the transmission loss in the fiber at 1550 nm.; and
- wherein at least a majority of the plurality of signal wavelengths received by each of the distributed Raman amplifier and the discrete Raman amplifier are also received by the other of the distributed Raman amplifier and the discrete Raman amplifier; and
- wherein at least a portion of the signal transmission line comprises a zero dispersion wavelength $\lambda_0$, and wherein $\lambda_p$ is within thirty (30) nanometers of $\lambda_0$.

17. The amplifier of claim 16, wherein at least a portion of the signal transmission line comprises a zero dispersion wavelength $\lambda_0$, and wherein $\lambda_p$ is less than $\lambda_0$.

18. The amplifier of claim 16, wherein the pump source comprises at least one semiconductor laser.

19. An optical amplifier, comprising:
- a distributed Raman amplifier that includes a signal transmission fiber wherein at least a portion of the signal transmission line comprises a distributed gain medium for the distributed Raman amplifier;
- a discrete Raman amplifier coupled in series to the distributed Raman amplifier, wherein additional gain is generated from the distributed Raman amplifier to compensate for a higher loss in the fiber when the fiber experiences a transmission loss of 0.03 dB/km greater than the transmission loss in the fiber at 1550 nm;
- a WDM coupled to the signal transmission line and positioned between the distributed Raman amplifier and the discrete Raman amplifier;
- a pump source coupled to the WDM and producing a pump beam $\lambda_p$; and
- an additional amplifier stage coupled in parallel with at least the discrete Raman amplifier, wherein a majority of the signal wavelengths amplified by the additional amplifier stage are not amplified by the discrete Raman amplifier;
- wherein a majority of signal wavelengths received by each of the distributed Raman amplifier and the discrete Raman amplifier are also received by the other of the distributed Raman amplifier and the discrete Raman amplifier.

20. An optical amplifier, comprising:
- a discrete Raman amplifier stage operable to be coupled to an installed signal transmission line;
- a WDM operable to be coupled between the discrete Raman amplifier and the signal transmission line;
- a pump source coupled to the WDM and producing a pump beam $\lambda_p$ comprising at least one wavelength less than 1400 nm, the WDM operable to introduce the pump beam into the signal transmission line;
- wherein at least a portion of the signal transmission line pumped by the pump beam forms a distributed Raman amplifier providing distributed Raman amplification to a plurality of signal wavelengths, and wherein at least a majority of the plurality of signal wavelengths received by each of the distributed Raman amplifier and the discrete Raman amplifier are also received by the other of the distributed Raman amplifier and the discrete Raman amplifier; and
- wherein at least a portion of the signal transmission line comprises a zero dispersion wavelength $\lambda_0$, and wherein $\lambda_p$ is less than $\lambda_0$.

21. An optical amplifier, comprising:
- a discrete Raman amplifier stage operable to be coupled to an installed signal transmission line;
- a WDM operable to be coupled between the discrete Raman amplifier and the signal transmission line; and
- a pump source coupled to the WDM and producing a pump beam $\lambda_p$, the WDM operable to introduce the pump beam into the signal transmission line;
- wherein at least a portion of the signal transmission line pumped by the pump beam forms a distributed Raman amplifier providing distributed Raman amplification to a plurality of signal wavelengths, and wherein additional gain is generated from the distributed Raman amplifier to compensate for a higher loss in the fiber when the fiber experiences a transmission loss of 0.03 dB/km greater than the transmission loss in the fiber at 1550 nm.; and wherein at least a majority of the plurality of signal wavelengths received by each of the distributed Raman amplifier and the discrete Raman amplifier are also received by the other of the distributed Raman amplifier and the discrete Raman amplifier; and wherein at least a portion of the signal transmission line comprises a zero dispersion wavelength $\lambda_0$, and wherein $\lambda_p$ is less than $\lambda_0$.

22. An optical amplifier, comprising:

a discrete Raman amplifier stage operable to be coupled to an installed signal transmission line;

a WDM operable to be coupled between the discrete Raman amplifier and the signal transmission line;

a pump source coupled to the WDM and producing a pump beam $\lambda_p$; and an additional amplifier stage coupled in parallel with at least the discrete Raman amplifier, wherein a majority of the signal wavelengths amplified by the additional amplifier stage are not amplified by the discrete Raman amplifier;

wherein at least a portion of the signal transmission line pumped by the pump beam forms a distributed Raman amplifier providing distributed Raman amplification to a plurality of signal wavelengths, and wherein at least a majority of the plurality of signal wavelengths received by each of the distributed Raman amplifier and the discrete Raman amplifier are also received by the other of the distributed Raman amplifier and the discrete Raman amplifier.

* * * * *